US012152939B2

United States Patent
Moroney et al.

(10) Patent No.: US 12,152,939 B2
(45) Date of Patent: Nov. 26, 2024

(54) SINGLE-PHOTON EMITTER USING FREQUENCY COMB

(71) Applicant: ORCA Computing Limited, London (GB)

(72) Inventors: Niall Moroney, London (GB); Robert Francis-Jones, London (GB)

(73) Assignee: ORCA Computing Limited, London (GB)

( * ) Notice: Subject to any disclaimer, the term of this patent is extended or adjusted under 35 U.S.C. 154(b) by 0 days.

(21) Appl. No.: 17/971,311

(22) Filed: Oct. 21, 2022

(65) Prior Publication Data

US 2024/0011834 A1  Jan. 11, 2024

(30) Foreign Application Priority Data

Jul. 11, 2022  (GB) ..................................... 2210157

(51) Int. Cl.
  *G01J 3/453*  (2006.01)
  *G02F 1/35*  (2006.01)
  *G02F 1/39*  (2006.01)

(52) U.S. Cl.
  CPC ............ *G01J 3/453* (2013.01); *G02F 1/3503* (2021.01); *G02F 1/3526* (2013.01); *G02F 1/353* (2013.01);
  (Continued)

(58) Field of Classification Search
  CPC ...... G01J 3/453; G02F 1/3503; G02F 1/3526; G02F 1/353; G02F 1/39; G02F 2203/48; G02F 2203/56; G02F 2203/70
  See application file for complete search history.

(56) References Cited

U.S. PATENT DOCUMENTS

2014/0240693 A1* 8/2014 Chou .................... G01B 11/14
                                                              356/5.09
2018/0231868 A1   8/2018 Grice et al.
(Continued)

FOREIGN PATENT DOCUMENTS

CN           207799305 U  *  8/2018
WO     WO 2022/074197 A1    4/2022

OTHER PUBLICATIONS

Intellectual Property Office of the United Kingdom, Combined Search and Examination Report, GB2210157.0, Feb. 1, 2023, eight pages.
(Continued)

*Primary Examiner* — Thanh Luu
*Assistant Examiner* — Mai Thi Ngoc Tran
(74) *Attorney, Agent, or Firm* — Fenwick & West LLP

(57) ABSTRACT

A system is disclosed for producing an output photon having a predefined frequency. The system comprises a frequency comb generator for generating a frequency comb. The system further comprises a frequency comb mode selector configured to: receive a heralding signal representative of the detection of a first photon of a frequency-correlated photon pair, the heralding signal indicative of a frequency of the heralded second photon of the frequency-correlated photon pair; and select, based on the received heralding signal, a comb spectral mode of the frequency comb. The system further comprises a non-linear photonic element configured to receive the heralded second photon and the selected comb spectral mode and produce an output photon having the predefined frequency based on the frequency of the heralded second photon and the selected comb spectral mode. Methods, controllers and computer-readable media are also described herein.

21 Claims, 13 Drawing Sheets

(52) U.S. Cl.
CPC ............ *G02F 1/39* (2013.01); *G02F 2203/48* (2013.01); *G02F 2203/56* (2013.01); *G02F 2203/70* (2013.01)

(56) References Cited

U.S. PATENT DOCUMENTS

| | | | |
|---|---|---|---|
| 2019/0257751 A1* | 8/2019 | Plant | G01J 3/433 |
| 2020/0401013 A1* | 12/2020 | Liao | G02F 1/365 |
| 2022/0221583 A1* | 7/2022 | Rolland | G01S 7/4917 |
| 2023/0367176 A1* | 11/2023 | Clemmen | G02F 1/395 |

OTHER PUBLICATIONS

Joshi, C. et al., "Frequency Multiplexing for Quasi-Deterministic Heralded Single-Photon Sources," arXiv:1707.00048v2, Sep. 1, 2017, pp. 1-28.

* cited by examiner

SINGLE-PHOTON EMITTER USING FREQUENCY COMB

CROSS-REFERENCE TO RELATED APPLICATION

This application claims priority to United Kingdom Application No. GB2210157.0, "Single-Photon Emitter using Frequency Comb," filed on Jul. 11, 2022, which is hereby incorporated by reference in its entirety.

TECHNICAL FIELD

The present disclosure relates to single-photon emitters, and in particular to single-photon emitters capable of emitting a single photon at a pre-selected or predefined frequency.

BACKGROUND

Single photons are useful for a variety of applications including metrology, quantum computing, quantum cryptography, imaging and random number generation. Accordingly, there is a need for reliable single-photon sources. An ideal single-photon source is capable of producing a single photon in a pre-selected field mode on-demand (in other words, each and every time that a user requires a single photon to be generated in that pre-selected field mode). In reality, such ideal single-photon sources are unrealizable due to losses and non-zero probabilities of producing multiple photons in the same mode.

Many known single-photon sources are probabilistic in nature and typically emit photons in pairs, the detection of one photon heralding the generation of the other. An example of a probabilistic single-photon source is illustrated in FIG. 1. A pump beam 102 is applied to a non-linear photon source 104 that probabilistically generates a photon pair 110. A first photon 106 (which may be referred to as an idler photon) is received by a detector 112, thereby heralding the production of the second photon 108 (typically referred to as a signal photon).

Probabilistic single-photon sources typically rely on non-linear processes such as spontaneous parametric down conversion (SPDC) or spontaneous four-wave mixing (SFWM). However, these non-linear processes are probabilistic and so cannot simultaneously achieve a high probability of producing a photon and a high single-photon fidelity. For example, in these non-linear processes the probability of a single photon being produced in a particular mode and the probability of two photons being produced in that mode are strongly linked, and so such sources are often operated in the regime of low-excitation probability. This in turn means that the time at which a single heralded photon will be produced is highly unpredictable. Nevertheless, the single photon fidelity of the heralded photon can be very high as the multiphoton component can be made arbitrarily small.

The unpredictability of these probabilistic single-photon sources makes them unreliable for many applications in which large quantities of single photons may be required, especially if such applications command that single photons should be generated on-demand and in a particular pre-selected or predefined field mode (for example at a particular frequency).

The present disclosure mitigates one or more problems of the prior art.

SUMMARY

According to an aspect of the disclosure, a system is provided for producing an output photon having a pre-selected or predefined frequency. The system comprises a frequency comb generator for generating a frequency comb. The system further comprises a frequency comb mode selector. The frequency comb mode selector is configured to receive a heralding signal representative of the detection of a first photon of a frequency-correlated photon pair, the heralding signal indicative of a frequency of the heralded second photon of the frequency-correlated photon pair. The frequency comb mode selector is further configured to select, based on the received heralding signal, a comb spectral mode of the frequency comb. The system further comprises a non-linear photonic element comprising a beam combiner with non-linear material, the non-linear photonic element configured to receive the heralded second photon and the selected comb spectral mode and produce an output photon having the pre-selected frequency based on the frequency of the heralded second photon and the selected comb spectral mode.

Advantageously, the system is capable of generating a single photon of a pre-selected frequency. Furthermore, as a frequency comb can cover a broad spectrum of frequencies, a suitable comb spectral mode can be selected for each second photon, even if consecutive second photons may have very different frequencies. Furthermore, as a frequency comb may be generated using a single laser source, the size of the system can be more compact than other designs and can be easier to manufacture.

The frequency comb generator may be for generating a Kerr frequency comb.

The frequency comb generator may comprise one or more microresonators, each microresonator supporting a corresponding optical resonance. The frequency comb generator may further comprise one or more optical couplers configured to couple light into and out of the one or more microresonators. The one or more microresonators may be whispering gallery mode microresonators. The one or more microresonators may be ring microresonators. The frequency comb generator may further comprise a pump laser.

The frequency comb mode selector may comprise a microresonator and an electro-optic modulator (EOM) configured to couple a selected comb spectral mode through the microresonator and towards the non-linear photonic element.

The frequency comb mode selector may comprise a plurality of microresonators, each microresonator resonant with a respective comb spectral mode of the frequency comb and arranged to couple its respective comb spectral mode through the microresonator and towards the non-linear photonic element; and a plurality of controllable filtering elements, each filtering element situated between and respective microresonator and the non-linear photonic element and configured to controllably prevent unselected comb spectral modes from reaching the non-linear photonic element. At least one filtering element may comprise a semiconductor optical amplifier configured to controllably amplify or absorb the respective comb spectral mode of the amplifier's respective microresonator. At least one filtering element may comprise an electro-optic intensity modulator.

The frequency comb mode selector may comprise one or more Mach-Zehnder interferometers (MZIs).

The system may further comprise a controller for controlling the frequency comb mode selector to select a comb spectral mode based on (e.g., in response to) the heralding signal. The controller may be implemented in an application specific integrated circuit (ASIC) or field programmable gate array (FPGA).

At least a portion of the system may be implemented on-chip.

At least a portion of the system may be implemented in bulk optics.

The system may comprise additional components or modules. For example, light may be propagated between different features of the system in optical fibre, in integrated optic waveguides, in any suitable waveguide device or in any combinations thereof.

The system may further comprise a photon pair source module for generating frequency-correlated photon pairs. The photon pair source module may comprise a cavity parametric down conversion photon pair source.

The system may further comprise a detection module comprising a detector arrangement comprising one or more photon detectors, the detector arrangement arranged to cause the generation of the heralding signal subsequent to (e.g., in response to) a detection of a first photon of a frequency-correlated photon pair. The detector module may further comprise a spectral demultiplexer for guiding photons along a plurality of frequency-dependent lightpaths; wherein each of the photon detectors is coupled to a respective frequency-dependent lightpath of the spectral demultiplexer such that a detection event at a particular photon detector is associated with the detection of a photon having a frequency within a particular frequency range. The spectral demultiplexer may comprise at least one microresonator for providing at least one of the frequency-dependent lightpaths. The spectral demultiplexer may comprise at least one of: a prism; a (dense) wavelength division multiplexer (D)WDM, a fibre Bragg grating; or a dichroic filter.

The non-linear photonic element may have a $\chi^{(2)}$ non-linearity.

The system may further comprise a beam combiner arranged to combine the heralded second photon and the selected comb spectral mode.

According to an aspect of the disclosure a method is provided for performance by a controller, for example a controller of a frequency comb mode selector or mode selection device. The method comprises selecting, based on a received heralding signal, a comb spectral mode of a frequency comb. The method further comprises causing, based on the selection, a reconfigurable mode selection apparatus (e.g. the frequency comb mode selector) to be reconfigured to permit the selected comb spectral mode to be incident on a non-linear photonic element. The received heralding signal is representative of the detection of a first photon of a frequency-correlated photon pair, the heralding signal indicative of a frequency of the heralded second photon of the frequency-correlated photon pair from among a plurality of possible frequencies. The non-linear photonic element is further arranged to receive the heralded second photon and to produce an output photon having a frequency based on the frequency of the heralded second photon and the selected comb spectral mode.

The method comprises selecting, based on a received heralding signal, a comb spectral mode of a frequency comb. The method further comprises causing the selected comb spectral mode to be received by a non-linear photonic element, wherein the non-linear photonic element is further arranged to receive the heralded second photon and to produce an output photon having the pre-selected frequency based on the frequency of the heralded second photon and the selected comb spectral mode. The received heralding signal is representative of the detection of a first photon of a frequency-correlated photon pair, the heralding signal indicative of a frequency of the heralded second photon of the frequency-correlated photon pair from among a plurality of possible frequencies.

According to an aspect of the disclosure, a controller is provided. The controller is configured to perform a method as described herein.

According to an aspect of the disclosure, a computer-readable storage medium is provided. The computer-readable storage medium has stored thereon a computer-readable circuit description of a controller for performing a method as described herein. The computer-readable circuit description, when processed in a controller generation system, causes the controller generation system to manufacture or otherwise generate an implementation of the controller. The computer-readable medium may comprise a non-transitory computer-readable medium.

Many modifications and other embodiments of the disclosure set out herein will come to mind to a person skilled in the art in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the disclosure.

BRIEF DESCRIPTION OF THE DRAWINGS

Embodiments of the disclosure will now be described, by way of example only, with reference to the accompanying figures in which.

Throughout the description and the drawings, like reference numerals refer to like parts. Furthermore, features in the drawings are not drawn to scale.

DETAILED DESCRIPTION

Whilst various embodiments are described below, the disclosure is not limited to these embodiments, and variations of these embodiments may well fall within the scope of the invention which is to be limited only by the claims.

Figure 1:
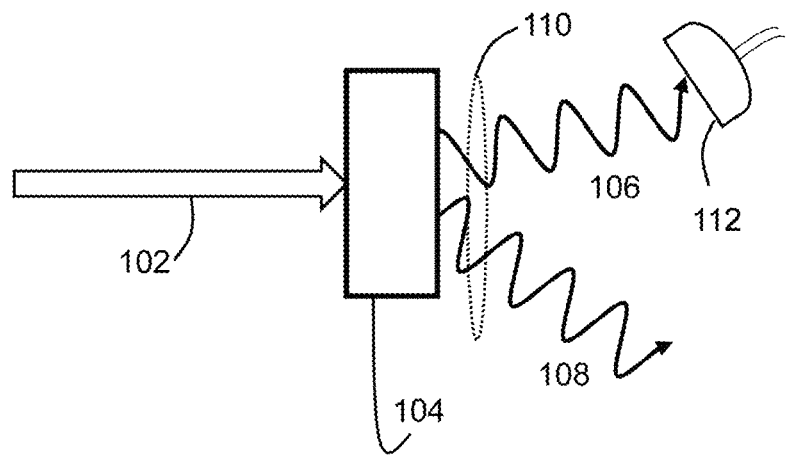
FIG. 1 shows an illustration of a heralded single-photon source according to an example.

As explained above in relation to FIG. 1, a pump beam can be used to probabilistically generate pairs of photons by providing the pump beam to a non-linear photonic element. Due to conservation of energy and momentum, the resultant photon pairs are entangled and the wavelengths/frequencies of the photons of each photon pair will be strongly correlated—if one were to measure the frequency of a first photon of the photon pair, one is able to determine the spectral properties of the (heralded) second photon of the photon pair without the need to directly measure the frequency of the second photon. Accordingly, if one knows the frequency of the first photon of a photon pair, then one can determine an appropriate transformation to be made to the frequency of the second photon of the photon pair to generate an output photon with a desired frequency.

For convenience of annotation, in what follows a frequency-correlated photon pair is denoted with reference numeral 110, the first photon of the photon pair is denoted with reference numeral 106, and the second photon of the photon pair is denoted with reference numeral 108, irrespective of the probabilistic method by which said photon pair 110 is produced. Furthermore, the words "first" and "second" in relation to the photons of a photon pair, are intended to act as labels of the photons of a photon pair and are not intended to be limiting. For example, a photon pair source may generate a plurality of photon pairs, and therefore generate a plurality of first photons and a plurality of second photons.

Figure 2:
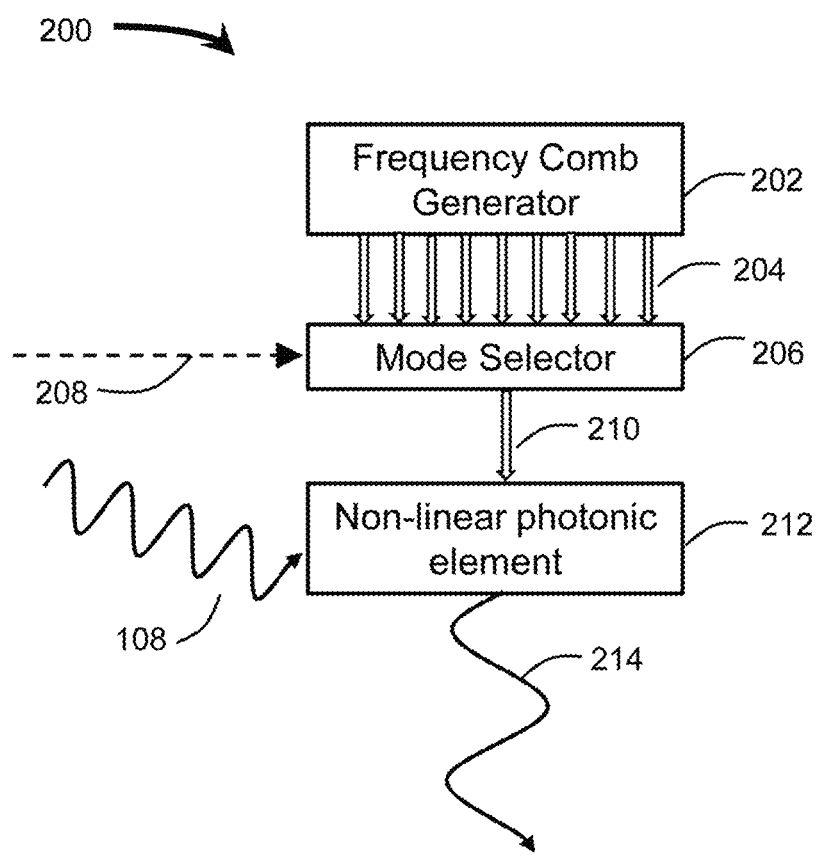
FIG. 2 shows an illustration of a system for producing a photon of a pre-selected frequency according to an example.

FIG. 2 illustrates a system 200 for producing an output photon 214 having a pre-selected frequency. The system 200 comprises a frequency comb generator 202, a frequency comb mode selector 206 and a non-linear photonic element 212. The skilled person will appreciate that other architectures are available. For example, the system may comprise more features.

In FIG. 2 and the other drawings herein, unless the context otherwise allows, a hollow arrow or plurality of hollow arrows indicates a path of classical light, while a solid undulating/oscillating arrow indicates a path of quantum light (in other words, one or more photons). A dashed arrow is understood to mean a flow of classical information, in analogue or digital form, such as a control signal. The paths indicated do not represent actual physical paths, but merely show how the light/photons/signals may be directed to and from different features of the described systems.

The frequency comb generator 202 is configured to generate a frequency comb 204. An optical frequency comb is an optical source with equidistant spectral modes (often referred to herein as "comb spectral modes"). In the frequency domain, an ideal frequency comb can be described by a series of delta functions, the frequencies of which can be expressed using the equation:

$$\omega_j = \omega_0 + (j \times \omega_s) \quad \text{(Equation 1)}$$

where j is an integer, $\omega_0$ is the carrier offset frequency (which may be referred to as the zeroth comb spectral mode) and $\omega_s$ is the spectral spacing between the "teeth" of the comb. In reality, each comb spectral mode may have a small associated bandwidth, and so not be representable by a delta function, although this bandwidth is still much smaller (e.g., for example, ten thousand times smaller or fifty thousand times smaller) than the spectral spacing $\omega_s$ between the teeth of the comb.

The frequency comb generator 202 may generate the frequency comb 204 in any suitable way. In some examples, the frequency comb generator 202 may comprise a comb generation element configured to receive laser light from a pump laser and generate a frequency comb in response. In other examples, the frequency comb generator 202 may further comprise the pump laser source.

In some examples, a frequency comb may be generated using a mode-locked laser such as a mode-locked Ti:Sapphire laser or a mode-locked Er:Fibre laser. The mode-locked laser may produce a series of temporally separated optical pulses, the spectral modes of which are spaced apart by a fixed spectral spacing typically between 100 MHz and 1 GHz (and more particularly between 100 MHZ and 250 MHz), and related to the inverse of the round-trip time for photons in the laser cavity.

In some examples, a frequency comb may be generated using a continuous-wave (CW) laser and electro-optical modulation. For example, an electo-optical modulator may be configured to modulate the amplitude or phase of the CW laser light.

In some examples, a frequency comb may be generated using four-wave mixing. For example, a frequency comb may be generated by providing two high-power sources of light to a photonic crystal fibre. In some examples, a four-wave mixing based frequency comb, also known as a Kerr frequency comb, may be formed by coupling a laser to a microresonator, for example as described in relation to FIG. 7A and FIG. 7B.

In some examples, a frequency comb may be generated using an optical parametric oscillator (OPO).

The frequency comb mode selector 206 (sometimes referred to as the mode selector 206) is configured to receive a heralding signal 208 representative of the detection of a first photon of a frequency-correlated photon pair, the heralding signal indicative of a frequency of the heralded second photon 108 of the frequency-correlated photon pair from among a plurality of possible frequencies. The frequency comb mode selector may also be referred to as a mode filter.

In some examples, the heralding signal may comprise an analogue or digital signal generated by a photon detector (not shown in FIG. 2) in response to detecting the first photon of the frequency-correlated photon pair. In some examples, the heralding signal may comprise an analogue or digital signal generated by a controller (not shown in FIG. 2) in communication with one or more photon detectors. The heralding signal 208 itself may be any suitable signal for conveying the information that a first photon has been detected, for example an electrical signal, a magnetic signal or an optical signal. In some examples, the mode selector 206 may comprise one or more photodetectors, and the heralding signal may accordingly be a signal internal to the mode selector 206. That is, receiving a heralding signal may comprise one portion of the mode selector 206 receiving the signal from another portion of the mode selector 206.

The mode selector/mode filter 206 is further configured to select, based on the received heralding signal, a comb spectral mode of the frequency comb 204. The selection may be performed in any suitable way, and several embodiments are described herein. However, the skilled person will appreciate that any mode selector 206 capable of selecting a single comb spectral mode and filtering out other comb spectral modes may be utilised.

The non-linear photonic element 212 is configured to receive the heralded second photon 108 and the selected comb spectral mode 210 and produce an output photon 214 having the pre-selected frequency based on the frequency of the heralded second photon 108 and the selected comb spectral mode 210. In some embodiments, the non-linear element 212 comprises a beam combiner with non-linear material. As used herein, stating that the output photon has the predefined frequency means the output photon has a frequency that is within an error threshold of the predefined frequency. For example, the carrier frequency of the output field may not drift by more than 50% of the linewidth of the predefined frequency.

The non-linear element 212 may comprise a material having a second order ($\chi^{(2)}$) non-linearity. For example, a suitable material may be periodically-poled lithium niobate (PPLN) or potassium titanyl phosphate (KTP). The second order non-linear photonic element 212 may use sum-frequency generation (SFG), in which the received second photon 108 and a photon of the selected comb spectral mode 210 are annihilated and an output photon 214 is generated having a frequency that is the sum of the frequencies of the annihilated second photon 108 and the annihilated photon of the selected comb spectral mode 210. The second order non-linear photonic element 212 may use difference-frequency generation (DFG) in which the received photon 108 and a photon of the selected comb spectral mode 210 are annihilated and an output photon 214 is generated having a frequency that is the difference of the frequencies of the annihilated second photon 108 and the annihilated photon of the selected comb spectral mode 210. It is possible to obtain an output photon 214 of a predefined frequency by providing the second photon 108 and a suitable selected comb spectral mode 210 to the non-linear photonic element 212.

In some examples, the non-linear photonic element 212 may comprise a material having a third order ($\chi^{(3)}$) non-linearity, for example a material that produces an output photon based on Bragg-scattering four-wave mixing. In this example, the mode selector may select two comb spectral modes as two comb spectral modes may be required for the non-linear effect to be seen.

The system 200 may comprise additional components or modules. For example, the photons of the photon pair 110, the frequency comb 204, the selected comb spectral mode 210 and the output photon 214 may be propagated in optical fibres, in free space using bulk optic components, in integrated optic waveguides, in any other suitable waveguide device or in any combinations thereof.

The system 200 may comprise a beam combiner for combining the second photon 108 of the pair 110 of frequency-correlated photons with the selected comb spectral mode 210 for provision to the non-linear photonic element 212. The beam combiner may comprise, for example, a wavelength division multiplexer.

The system 200 may further comprise one or more filters. For example, a large proportion of the selected comb spectral mode 210 may be expected to pass through the non-linear photonic element 212 and accordingly the system 200 may comprise a filter to filter out the remainder of the comb spectral mode 210 and ensure that only the output photon 214 is emitted by the system 200.

Figure 3:
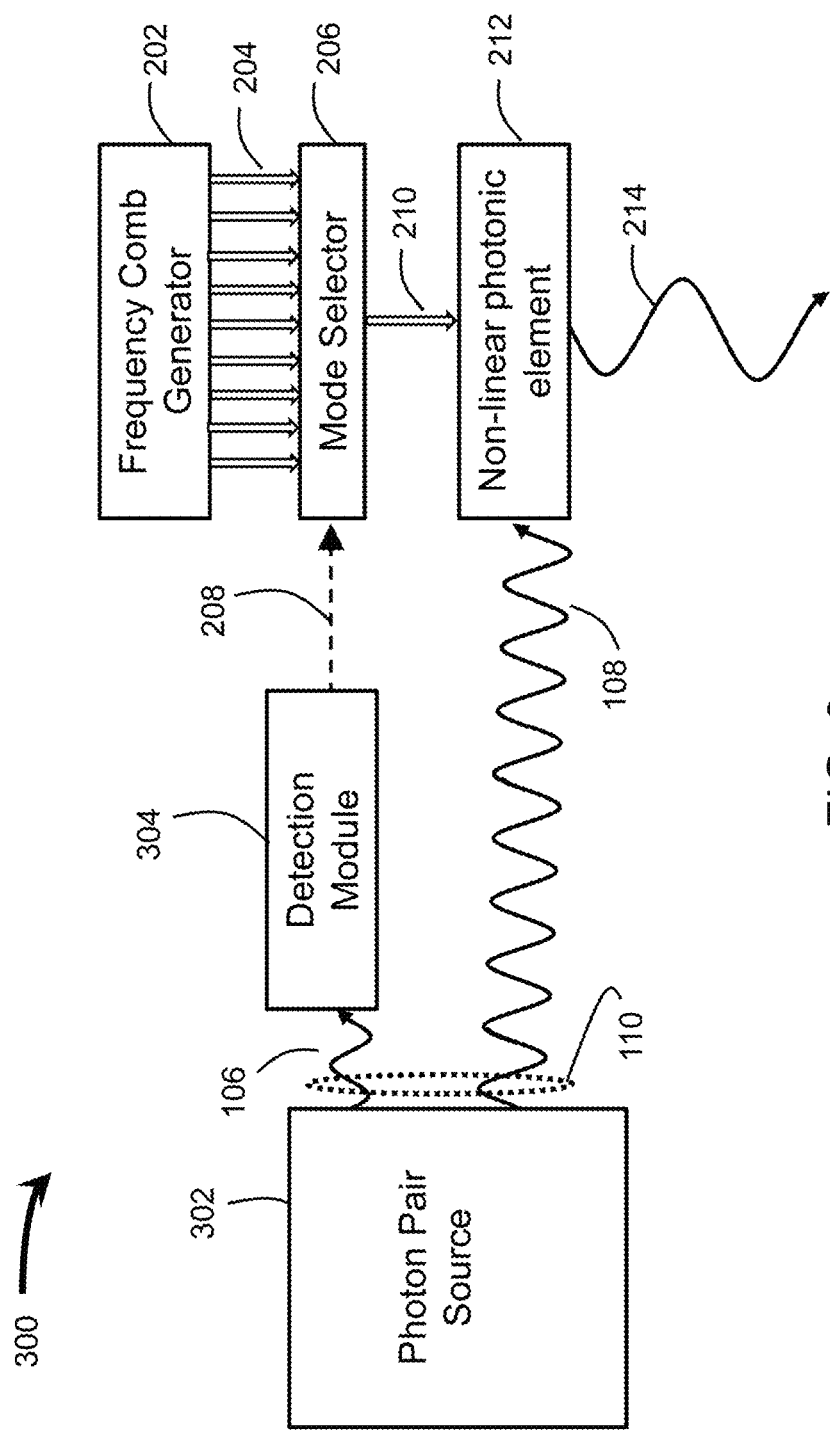
FIG. 3 shows an illustration of a system for producing a photon of a pre-selected frequency according to an example.

FIG. 3 illustrates a system 300 for producing an output photon having a pre-selected frequency. The system 300 includes the system 200 of FIG. 2 as a subsystem. The system 300 further comprises a photon pair source 302 and a detection module 304. The system 300 utilises spectral multiplexing to more reliably produce an output photon at a pre-selected frequency. The use of the subsystem 200 means that constraints on the frequencies of the photons (106,108) generated by the photon pair source module can be relaxed. Accordingly, a photon pair source module that generates photons across a wide spectral range may be used. This means, that a photon pair source module can be used that generates photon pairs at a higher rate than would be possible with, for example, the probabilistic single-photon source of FIG. 1. As explained further above, probabilistic single-photon sources typically rely on non-linear processes such as spontaneous parametric down conversion (SPDC) or spontaneous four-wave mixing (SFWM). Such probabilistic processes cannot simultaneously achieve a high probability of producing a photon and a high single photon fidelity. For example, in these non-linear processes the probability of a single photon being produced in a particular spectral mode and the probability of two photons being produced in that spectral mode are strongly linked, and so such sources are often operated in the regime of low-excitation probability. This in turn means that the time at which a photon pair 110 will be produced is highly unpredictable. One can boost the probability of obtaining a photon pair by not requiring that the signal photon be produced in a particular mode, but instead by requiring that the signal photon be produced having a frequency from among a plurality of frequencies. In such circumstances, spectral multiplexing can be used to more reliably generate an output photon 214 on demand that has a pre-selected frequency.

The photon pair source module 302 is configured to probabilistically generate pairs 110 of frequency-correlated photons across a range of spectral modes. That is, the first (second) photon 106 (108) of each photon pair may have a frequency from among a plurality of possible frequencies.

The photon pair source module 302 comprises non-linear media having a second-order or third-order non-linearity. For example, the photon pair source module 302 may generate photon pairs based on spontaneous four wave mixing (SFWM) or spontaneous parametric down conversion (SPDC). Any suitable photon pair source capable of producing photon pairs across a range of spectral modes are suitable. For example, the photon pair source module 302 may comprise a plurality of non-linear elements, each pumped by slightly different pump lasers. Alternatively, a photon pair source may comprise a cavity source, for example as described below in relation to FIG. 5A.

The detection module 304 comprises one or more photon detectors. The photon detectors 620 may be photon number resolving (PNR) detectors, capable of determining how many photons are received. For example, the detectors 620 may comprise superconducting nanowire detectors that generate an output signal intensity proportional to the (discrete) number of photons that strike a detector. PNR detectors are useful in circumstances where it is useful to know whether multiple photons are being generated in the same spectral mode at the same time. Alternatively, the photon detectors may not have PNR capabilities. For example, the detectors may comprise avalanche photodiodes.

The detection module 304 is arranged to cause the generation of the heralding signal 208 in response to a detection of a first photon 106 of a frequency-correlated photon pair 110. To this end, the detection module 304 is configured to place the first photon 106 in a particular spatial or temporal mode based on a frequency of that first photon 106, and accordingly a detection event in a particular spatial or temporal mode is indicative of a frequency of that first photon, and by extension is indicative of a frequency of the corresponding second photon.

As the photon pair source module 302 is configured to generate frequency-correlated photon pairs across a range of frequencies, there is a non-zero probability that the two or more photon pairs are generated contemporaneously—that is, substantially simultaneously and within the same photon pair generation clock cycle (e.g within the pump pulse duration for the photon pair source module). In such circumstances, the detector arrangement may detect two first photons of different frequencies at the same time, thereby heralding the presence of two second photons having different frequencies. Some photon pairs may be more suitable than others for causing the system 300 to produce a good quality output photon 214 reliably. For example, dependent on the materials used in the system 300, the system 300 may be more susceptible to signal photon loss at one frequency than another. As another example, different comb spectral modes of the frequency comb may have different intensities which can influence the conversion rate for the output photon. As another example, depending on mismatches between the available comb spectral modes to select from, and the frequencies of the signal photons produced by the photon pair source, some signal photons may be used to generate output photons having a higher purity than those generated by other signal photons. The non-linear photonic element 212 may have different conversion efficiencies for different frequencies of heralded second photons.

Accordingly, in the event of a contemporaneous detection of two first photons of two frequency-correlated photon pairs, the two photons having different frequencies, the system 300 may be configured to select a comb spectral mode that complements the heralded second photon of the pair of heralded second photons for which the output photon 212 is "better" according to some metric. For example, the selected comb spectral mode may help to produce the output photon having the higher purity, or that for which the non-linear photonic element 212 has the greater conversion efficiency. Such a selection may be handled in a number of ways. As a first example, a controller (not shown) of the detector arrangement may register that two detection events have occurred and may generate a heralding signal corresponding to the "best" first photon of the two detected first photons. As a second example, a controller (not shown) of the mode selector may receive a heralding signal indicative of the presence of both second photons, and may select the comb spectral mode that complements the "best" of the two second photons.

The system 300 may comprise additional components or modules. For example, light may be propagated in optical fibre, in free space using bulk optic components, in integrated optic waveguides, in any other suitable waveguide device or in any combinations thereof.

The system 300 may comprise, for example, a beam separator for separating the first photon 106 from the second photon 108 and guiding the first photon 106 towards the detection module 304 and guiding the second photon towards the non-linear photonic element 212.

In examples, the system 300 may be provided in whole or in part as an integrated circuit (having photonic elements). For example, many of the features of system 300 may be provided as a photonic integrated circuit.

In some examples, the system 300 might be provided as a distributed system. For example, the system 300 may be formed of a plurality of units for or installation in a server or computer rack (such as a standard 19 inch server rack), with the modules interconnected with various optical fibre interconnects and/or control lines. For example, the photon pair source module 302 may be embodied in one or more units in a server rack. The detection module 304 may be embodied in one or more units in a server rack. The subsystem 200 may be embodied in one or more units in a server rack.

Figure 4:
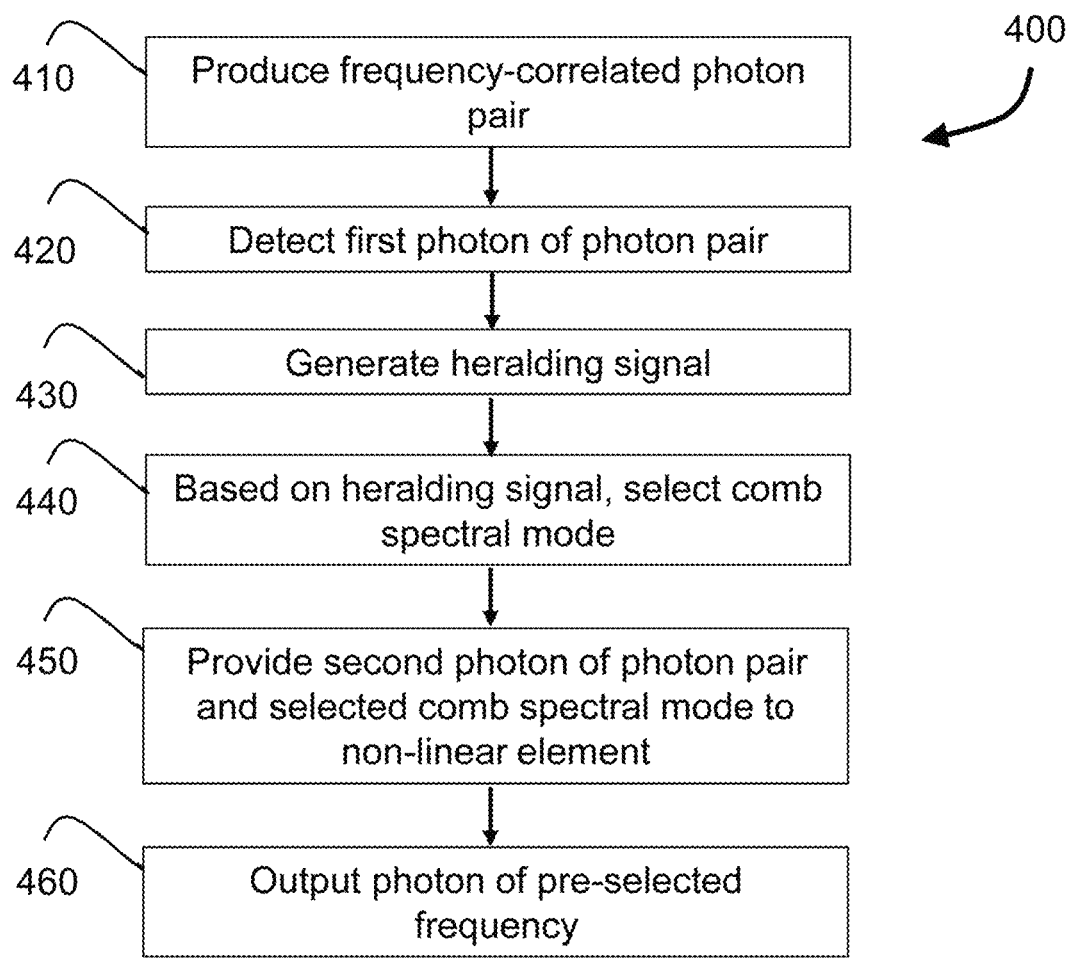
FIG. 4 shows a flowchart of a method for producing a photon of a pre-selected frequency according to an example.

FIG. 4 shows a flowchart of a method for producing an output photon 214 having a pre-selected frequency. The method is suitable for performance by a system such as that depicted in FIG. 3. In examples the method may be coordinated or otherwise controlled by a dedicated controller. The skilled person will appreciate that the process may comprise further steps.

At 410, a frequency-correlated photon pair 110 is produced, the photon pair 110 comprising a first photon 106 and a second photon 108. The first photon 106 has a frequency from among a plurality of possible frequencies. The second photon 108 accordingly also has a frequency from among a plurality of possible frequencies. With reference to FIG. 3, the photon pair source 302 is configured to generate the frequency-correlated photon pair.

At 420, the first photon 106 of the photon pair 110 is detected by a detector arrangement arranged such that a detection event can be correlated with the first photon 106 having a frequency that is either equal to a particular frequency or is within a particular frequency range. Accordingly, a detection event can be correlated with a frequency of the first photon 106 and by extension with a frequency of the second photon 108. With reference to FIG. 3, the detection module 304 is configured to detect the first photon 106.

At 430, a heralding signal 208 is generated. The heralding signal 208 is generated based on the frequency of the detected first photon 106. Accordingly, the heralding signal is indicative of a frequency of the (heralded) second photon 108 of the photon pair 110. With reference to FIG. 3, the detection module 304 is configured to generate the heralding signal 208.

At 440, a comb spectral mode of a frequency comb is selected based on the heralding signal 208. With reference to FIG. 3, the mode selector 206 is configured to receive the heralding signal 208 and, based on the heralding signal, select a comb spectral mode of a frequency comb 204.

At 450, the second photon 108 of the photon pair 110 and the selected comb spectral mode 210 are provided to a non-linear photonic element. Due to a non-linear process, at 460 the second photon 108 and a photon of the selected comb spectral mode 210 are both absorbed and an output photon 214 is produced. With reference to FIG. 3, the non-linear photonic element 212 is arranged to receive the second photon 108 and the selected comb spectral mode and to accordingly produce the output photon 214.

Figure 5A:
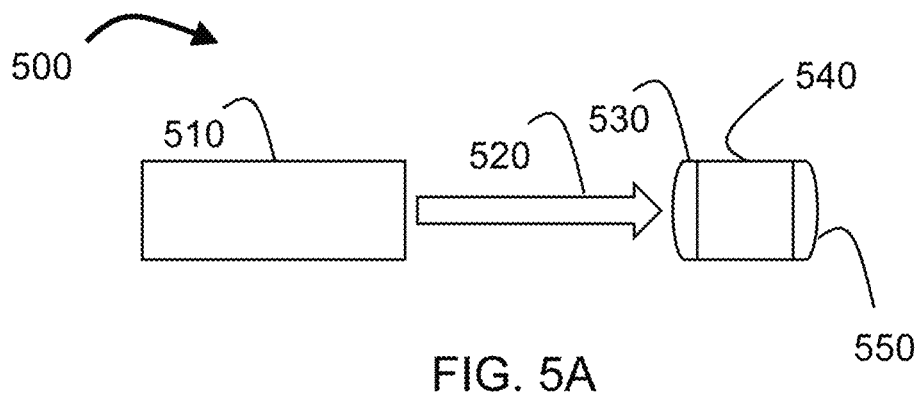
FIG. 5A shows an illustration of a photon pair source according to an example.

FIG. 5A shows an example photon pair source module 500, that may be used as photon pair source module 302 of FIG. 3. In this example, the photon pair source module comprises a non-linear photonic structure 540 inside a photonic cavity having optically reflecting elements 530, 550. For example, the non-linear photonic structure 540 may be placed between mirrors, for example bulk optic mirrors, or Bragg gratings. As an example alternative, the non-linear photonic structure 540 may comprise a non-linear crystal waveguide with end facets covered with a reflective coating. The photon pair source of FIG. 5A is accordingly an example of a cavity parametric down conversion (CPDC) device. The optical cavity (530, 550) enables the confinement of light with frequencies such that the round-trip distance is equal to an integer number of wavelengths. Accordingly, there is a plurality of different frequency modes which satisfy this constraint. This set of frequency modes can be grouped as modal pairs that are equidistant in frequency about some central frequency. Each of these modal pairs can support the generation of a photon pair with frequencies equal to those of the associated modes. Accordingly, the CPDC is capable of producing a plurality of photon pairs across a range of frequencies.

The non-linear photonic structure 540 may use spontaneous four wave mixing (SFWM) or spontaneous parametric down conversion (SPDC) to convert pump light 520 into signal/idler photon pairs. For SPDC the resulting photon pairs have lower frequencies and longer wavelength than the pump light 520. Examples of materials that may be used as the non-linear photonic structure 540 include any of, but not limited to: $LiIO_3$., $β-BaB_2O_4$, $BiB_3O_6$, KTP ($KTiOPO_4$), KTA, periodically-poled crystals, such as PPLN (Periodically Poled Lithium Niobate).

FIG. 5A further shows an optical source system 510, also referred to as a "source system" or "pump system". The pump system 510 is configured to generate a pump beam 520. In other examples, the pump system 510 may be considered to be part of the photon pair source 302.

Figure 5B:
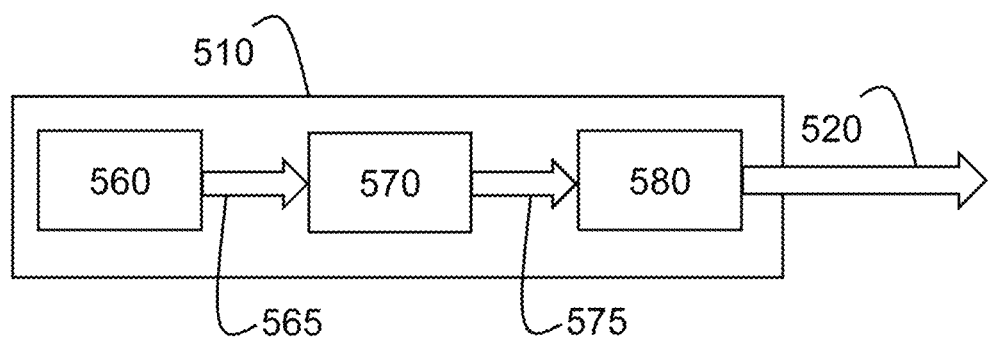
FIG. 5B shows an illustration of a pump source system, according to an example, that may be used as part of a photon pair source such as that depicted in FIG. 5A.

An example pump system 510 is shown in FIG. 5B, although the skilled person will appreciate that other pump systems may be suitable. The pump system 510 in FIG. 5B comprises components including at least an optical source 560 configured to receive one or more electrical signals and output light 565. Examples of the optical source 560 include but are not limited to a laser, such as a distributed feedback (DFB) laser. The optical source 560 may output light that is pulsed or continuous wave (CW). The wavelength of operation of the optical source may be any wavelength, for example between 700-1700 nm, or more of the following bands: the O-band (original band: 1260-1360 nm); the C-band (conventional band: 1530-1565 nm), the L-band (long-wavelength band: 1565-1625 nm); the S-band (short-wavelength band: 1460-1530 nm); the E-band (extended-wavelength band: 1360-1460 nm). The wavelength of operation of the optical source 560 may be a telecommunications wavelength, for example between 1300 nm and 1600 nm. The optical source may be wavelength tuneable.

The output light 565 is input into an optical modulator 570 which outputs light pulses 575. The light pulses may be gated by the optical modulator 570 to have any desired repetition frequency, for example a frequency continuously tuneable between 100 kHz and 1 GHz. In some examples the optical modulator may not be used and the desired pulses may be output directly from the optical source 560 which may be directly modulated or comprise an integrated optical modulator. The optical modulator may be an absorption-based modulator or an interferometric-based modulator such as a Mach-Zehnder modulator.

The output of the optical modulator 575 is input into a series of one or more further non-linear optical elements 580, for example optical elements set up to use second harmonic generation (SHG) to convert input light 575 into frequency doubled output light 520. FIG. 5B shows a single further non-linear photonic element 580, however the pump system 510 may comprise a series of two or more further non-linear photonic elements 580, each outputting its light into the next element, for example a series of two SHG based optical elements each frequency doubling its input light. The optical output 520 of the chain or one or more further non-linear photonic elements 580 is input into cavity (530, 550) as pump light. Examples of types of further non-linear optical elements 580 include but are not limited to bulk or waveguided SHG stages comprised of non-linear optical materials such as ppLN, ppKTP, either in a single pass or a multi-pass cavity configuration. Using frequency doubling elements 580 in the pump system 510 enables the use of standard lasers such as standard telecommunication lasers to be the initial optical source 560 for the system 300 if the wavelength of the photon pairs 110 is to be less than or equal to the wavelength of the optical source 560.

The components of the optical source system 510 may be formed separately and optically linked to each other or any one or more of them may be integrated together. The optical links between any two of the components of the optical source system may be any of: free space, optical fibre, integrated waveguides. The optical source system 510 may have other components such as but not limited to, optical amplifiers or optical attenuators to control the light amplitude of any of light signals 565, 575, 520 and optical polarization controllers to control the polarization of any of light signals 565, 575, 520.

The pump source 510 (for example, the optical source 560 and/or the optical modulator 570) may in some examples receive electronic signals derived from detection signals from the detection module 304. This enables the detection of the first photons 106 of generated photon pairs 110 to feed back into the driving of the pump system 510. Detection signals generated by the detection module 304 may be used to determine whether photon pairs are being generated at too high or too low a rate. If photon pairs 110 are being over generated in time intervals, then the feedback signal to the pump source system 510 may be used to decrease the output power of the pump source 510, for example by controlling the peak output power of any component in the pump source system 510 such as the optical source 560, modulator 570 and/or any other components such as optical amplifiers (not shown). Conversely if there are statistically too few photon pairs 110 being generated in time intervals output by the cavity (530,550), then the feedback signal provided to the pump source system 510 may be used to increase the power of the optical signal 520 entering the cavity (530,550).

The photon pair source and pump system 510, including any of the components described above, may be formed by using separate components and optically linking them using any of free space and bulk optics components, optical fibres and integrated optics. Additionally, or alternatively any two or more components may be integrated together using monolithic or hybrid integration.

Figure 6:
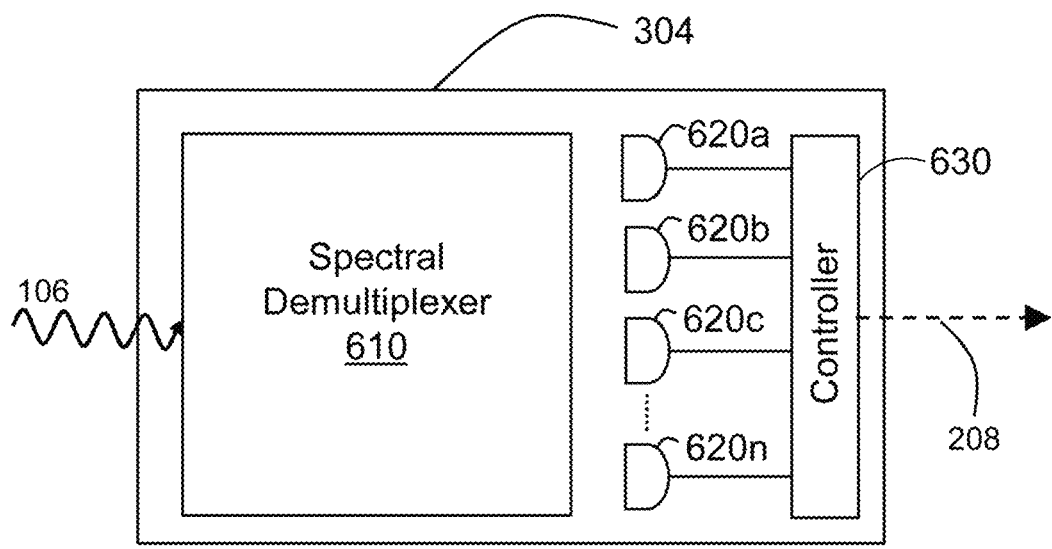
FIG. 6 shows an illustration of a detector module capable of generating a heralding signal based on a frequency of a photon according to an example.

FIG. 6 shows an illustration of a detection module 304 according to an example. The detection module 304 is configured to receive a first photon 106 of a photon pair 110 and to cause the generation of a heralding signal 208 based on a frequency of that detected first photon 106, the heralding signal 208 indicative of a frequency of the second photon 108 of the photon pair 110.

The detection module 304 comprises a spectral demultiplexer 610 for guiding photons along frequency-dependent lightpaths. The spectral demultiplexer 610 is configured to receive a first photon 106 of a photon pair 110 and to guide the first photon 106 along a spatial lightpath based on the frequency of the first photon 106 towards a corresponding detector. The spectral demultiplexer 610 may be implemented in a number of ways. For example, the spectral demultiplexer may comprise at least one of a prism, a wavelength division multiplexer (WDM), a dense wavelength division multiplexer (DWDM), a fibre Bragg grating, or a dichroic filter, or the spectral multiplexer 610 may be implemented using any other component(s) capable of spatially separating light of different frequencies.

The detection module 304 further comprises a detector arrangement 620, the detector arrangement comprising a plurality of photon detectors 620a to 620n. While four detectors are shown in FIG. 6, the skilled person will appreciate that the detector arrangement 620 may comprise more or fewer photon detectors.

Each of the photon detectors is coupled to a respective frequency-dependent lightpath of the spectral demultiplexer 610 such that a detection event at a particular photon detector (e.g. 620a) is associated with the detection of a photon having a specific frequency or having a frequency within a particular frequency range. The frequency range may depend on the choice of spectral demultiplexer and/or the arrangement of the detectors relative to the spectral demultiplexer. The photon detectors may be photon number resolving (PNR) detectors, capable of determining how many photons are received. For example, the detectors 620 may comprise superconducting nanowire detectors that generate an output signal intensity proportional to the (discrete) number of photons that strike a detector. The PNR detectors may comprise transition edge sensors (TESs). PNR detectors are useful in circumstances where it is useful to know whether multiple photons are being generated in the same spectral mode at the same time. Alternatively, the photon detectors may not have PNR capabilities. For example, the detectors may comprise avalanche photodiodes.

The detection module 304 further comprises a controller 630 communicatively coupled to each of the photon detectors 620a to 620n. The controller 630 is configured to generate a heralding signal 208 in response to a detection event, the heralding signal indicative of a frequency of the second photon 108 corresponding to the detected first photon 106 of the photon pair. The controller 630 may be implemented in any suitable low-latency architecture, for example in a Field Programmable Gate Array (FPGA) or an Application Specific Integrated Circuit (ASIC).

The controller 630 may be configured to further generate a feedback signal for controlling the rate of generation of photon pairs produced by the photon pair source module 302, for example by controlling the power of a pump system (such as pump system 510). For example, if detection events are occurring at multiple photon detectors simultaneously, then the controller 630 may cause the rate of generation of photon pairs produced by the photon pair source module 302 to be decreased, while if no detection events are registered for a number of time intervals or a predetermined duration, then the controller 630 may cause the rate of generation of photon pairs produced by the photon pair source module 302 to be increased.

The skilled person will appreciate that the detection module 304 of FIG. 6 may comprise more components. Furthermore, the detection module 304 may be provided on-chip (with on-chip nanowire detectors for example) or may be provided in a distributed architecture (for example, in which the detector arrangement 620 is provided in one or more units in a server rack and the controller is provided in another one or more units in the server rack).

While the spectral demultiplexer 610 of FIG. 6 encodes the spectral information of the received first photons 106 in spatial modes (by guiding each photon to a particular spatially separated detector based on frequency), the skilled person will appreciate that other spectral demultiplexers may operate in other ways, for example by encoding the spectral information of received first photons 106 in temporal modes to be received by a single photon detector.

Figure 7A:
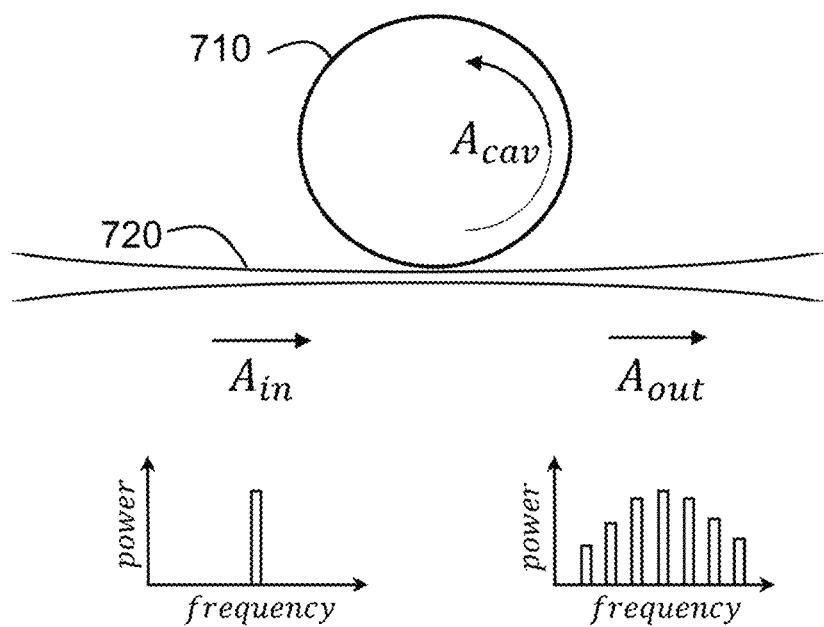
FIG. 7A shows an illustration of a frequency comb generator according to an example.

FIG. 7A illustrates a frequency comb generator 202 according to an example. In this example, the frequency comb generator 202 is able to generate a type of frequency comb known as a Kerr frequency comb. The frequency comb generator 202 comprises a comb generation element in the form of a microresonator 710 and an optical coupler 720 for coupling light into and out of the microresonator 710 via their overlapping evanescent fields. As will be appreciated by the skilled person, a microresonator 710 is a resonator having some micron-level features, and is a closed-circuit object that supports an optical resonance. A microresonator 710 supporting an optical resonance means the light that enters the closed circuit of the microresonator 710 is amplified at at least one resonant frequency due to constructive interference and total internal reflection in the microresonator 710. Example materials for microresonators include silicon, silica, silicon nitride, lithium niobate and crystalline fluorides. Example diameters of microresonators range from microns to hundreds of microns or even in sub-10 s of millimeters. Such microresonators can be fabricated in bulk materials—(e.g. rod resonators can be made using a lathe technique), or can be fabricated on-chip (for example as ring, race-track or toroid resonators). This can be done via a tapered optical fibre, prism, or on-chip waveguide.

An optical coupler (e.g., 720) couples light into and out of a microresonator (e.g., 710). The optical coupler may be a waveguide, for example an on-chip waveguide. The optical coupler may be attached to a waveguide. The optical coupler may comprise a tapered optical fibre, or a prism. The optical coupler may guide light from a light source into a microresonator. The optical coupler may guide light from a microresonator to a detector. The optical coupler may be a buried waveguide, a ridge waveguide or a rib waveguide. The optical coupler may be fabricated at the same time as the microresonator.

The microresonator 710 of FIG. 7A is a whispering gallery mode (WGM) resonator. A WGM resonator includes of a circular dielectric. The WGM resonator 710 is configured to receive an optical field $A_{in}$ and to produce a cavity field $A_{cav}$ and an output field $A_{out}$. The cavity field is guided around the inner face of the dielectric via total internal reflection, with cavity intensity building up when there is constructive interference with the input after a round trip.

The observation of nonlinear effects is based on the light intensity. Light Intensity is well described by a build-up factor, which can be modelled as the absolute square of the ratio of the output field to the input field:

$$\left|\frac{A_{out}}{A_{in}}\right|^2 = \frac{|t|^2}{1 + |r|^2\exp[-2V\alpha] - 2|r|\exp[-V\alpha]\cos[\omega V + \rho]} \quad \text{(Equation 2)}$$

where t and r are the transmission and reflection coefficients of the coupling between the WGM resonator 710 and optical coupler 720, V is the round trip time of light in the WGM resonator 710, α is the optical loss rate, ω is the field frequency and ρ is the phase accumulation from the reflection at the coupling point. The cosine term in the denominator of Equation 2 leads to periodic minima, giving rise to periodic maxima of the cavity intensity. Accordingly, the output field $A_{out}$ provides a frequency comb. This is illustrated in FIG. 7A by the two sketches of graphs indicating frequency modes. The free spectral range (FSR) of the WGM resonator 710 is the difference in frequency between adjacent comb spectral modes, which using the notation of Equation 1 can be written as:

$$\omega_s = \frac{2c}{dn_0} \qquad \text{(Equation 3)}$$

where c is the speed of light in a vacuum, $n_0$ is the refractive index of the material from which the WGM resonator 710 is made, and d is the diameter of the WGM resonator 710.

Figure 7B:
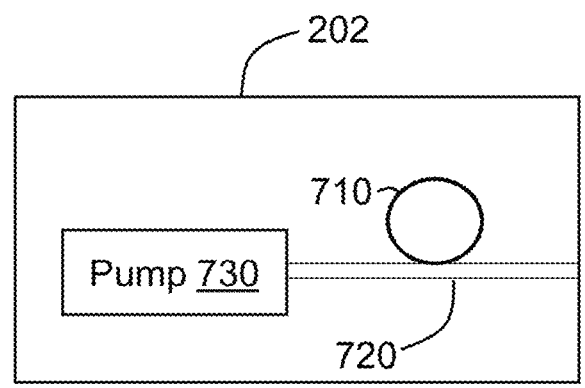
FIG. 7B shows an illustration of a frequency comb generator according to an example.

The frequency comb generator 202 may further comprise a pump system 730 for providing the input field $A_{in}$ as illustrated in the example of FIG. 7B. The pump system 730 may comprise, for example, a CW laser or a pulsed laser.

Figure 8:
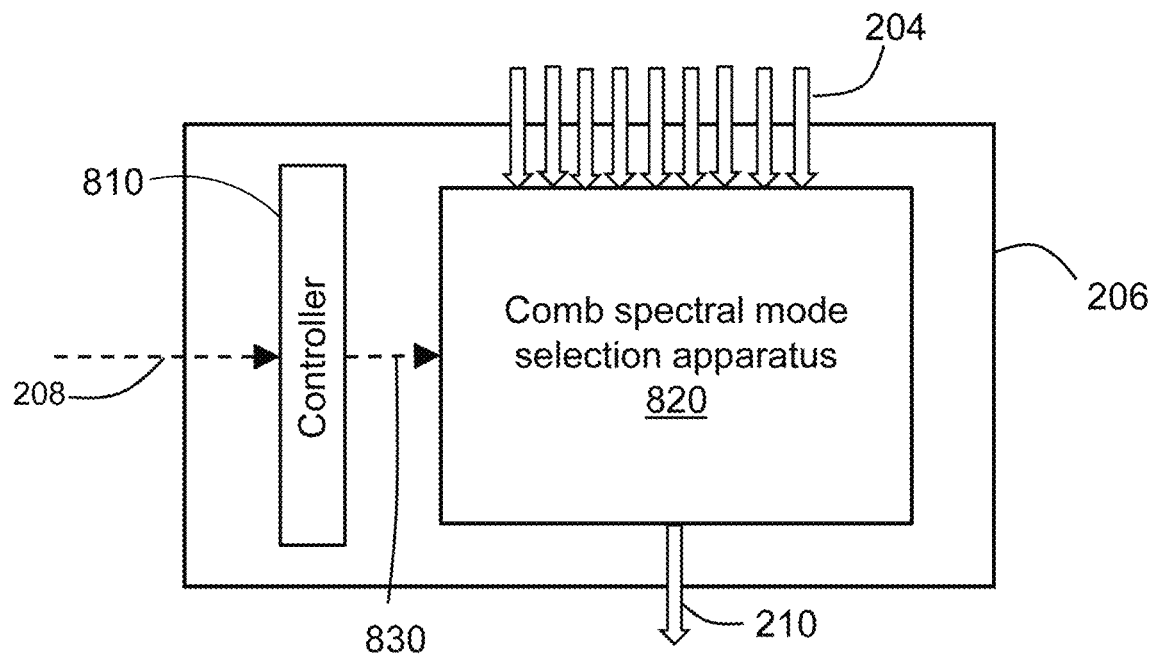
FIG. 8 shows an illustration of a mode selection module according to an example.

FIG. 8 shows a mode selector 206 according to an example. The mode selector 206 is configured to receive a heralding signal 208 representative of the detection of a first photon of a frequency-correlated photon pair, the heralding signal indicative of a frequency of the second photon of the frequency-correlated photon pair. The mode selector 206 is further configured to select, based on the received heralding signal, a comb spectral mode of the frequency comb 204.

In the example of FIG. 8, the mode selector 206 comprises a controller 810 and comb spectral mode selection apparatus 820. The comb spectral mode selection apparatus 820 may comprise any physical apparatus controllable by one or more control signals 830 from the controller 810 to actively select one comb spectral mode 210 to be provided to the non-linear photonic element 212 and/or to passively select one comb spectral mode 210 to be provided to the non-linear photonic element 212 by filtering out unwanted comb spectral modes. A number of examples of suitable comb spectral mode selection apparatuses are described further below.

The controller 810 may be implemented in a Field Programmable Gate Array (FPGA) or an Application Specific Integrated Circuit (ASIC) or in any other suitable architecture. The controller 810 of FIG. 8 is configured to receive a heralding signal 208, and to generate a control signal 830 to control the comb spectral mode selection apparatus 820. The control signal 830 may be an electrical signal, photonic signal, magnetic signal or otherwise.

In examples, the controller 810 may be the same controller 630 of the detection module 304 or otherwise integrated with the controller 630 of the detector arrangement. That is, controller 810 may additionally have the functionality described above in relation to the controller 630 of the detection module 304. In such circumstances, the heralding signal 208 may comprise one of a plurality of heralding signals directly generated by detectors 620 in response to detection events. The controller 810 may provide feedback signals to control the rate of generation of photon pairs by the photon pair source 302.

Figure 9:
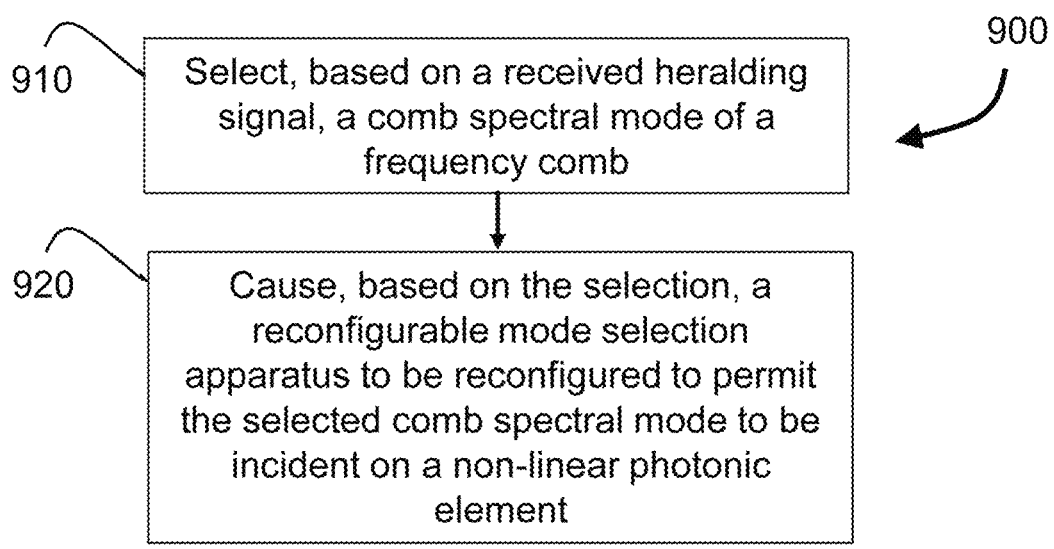
FIG. 9 shows a flowchart of a method for causing an output photon of a pre-selected frequency to be generated according to an example.

FIG. 9 shows a flowchart of a method for performance by a controller of system 200 (or system 300), such as controller 810.

At 910, the method comprises selecting, based on a received heralding signal 208, a comb spectral mode of a frequency comb.

At 920, the method comprises causing, based on the selection, a reconfigurable mode selection apparatus (e.g. a mode selector) to be reconfigured to permit the selected comb spectral mode to be incident on or be received by a non-linear photonic element. Said causing may comprise, for example, generating an appropriate one or more control signals to control the mode selection apparatus to actively select a particular mode of the frequency comb by, for example, routing the selected comb frequency mode towards the non-linear element. Said causing may comprise, for example, generating an appropriate one or more control signals to control the mode selection apparatus to filter out (e.g., all) unwanted modes of the frequency comb, thereby passively selecting the particular mode of the frequency comb.

Figure 10:
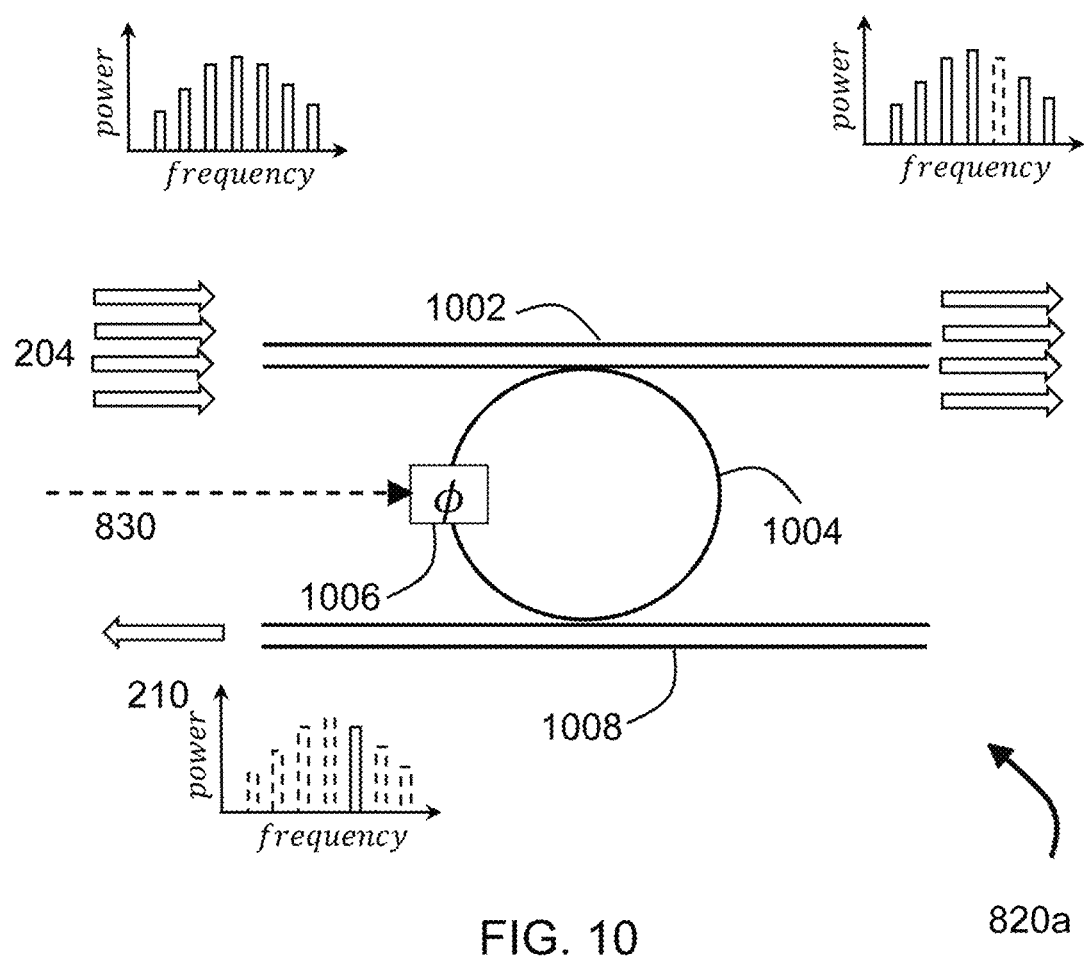
FIG. 10 shows an illustration of a mode selection module according to an example.

FIG. 10 shows an illustration of a comb spectral mode selection apparatus 820a according to an example. The comb spectral mode selection apparatus 820a comprises a WGM resonator 1004 situated adjacent to a first optical coupler 1002 and a second optical coupler 1008. The first optical coupler 1002 is configured to receive a frequency comb 204 from a frequency comb generator. A comb spectral mode of the frequency comb 204 may be coupled through the WGM resonator 1004 to the second optical coupler 1008 if the resonance of the WGM resonator 1004 is suitable tuned, and the selected comb spectral mode 210 is output from the second optical coupler 1008. Meanwhile, the unselected comb spectral modes are not coupled through the WGM resonator 1004 and so remain in the first optical coupler and are filtered out.

The comb spectral mode selection apparatus 820 further comprises an electro-optic modulator (EOM) 1006 configured to couple a selected comb spectral mode through the microresonator 1004 to an output port (in other words, the output of the second optical coupler 1008) and towards the non-linear photonic element 212. In particular, the EOM 1006 of FIG. 10 is configured to adapt the resonance properties of the microresonator 1004 in response to a received control signal 830.

The EOM 1006 may comprise, for example, a phase modulator. A field is on resonance when it accumulates an integer number of 2π phase in a single round trip, with a resonance frequency being the value for which such a phase accumulation occurs. A phase modulator is able to add a selected phase adjustment to a field, thereby influencing which frequencies are on resonance with the resonator. Fields which are on resonance can couple into and through a resonator and appropriate control of a phase modulator can help ensure that this only happens for a single comb spectral mode.

Figure 11A:
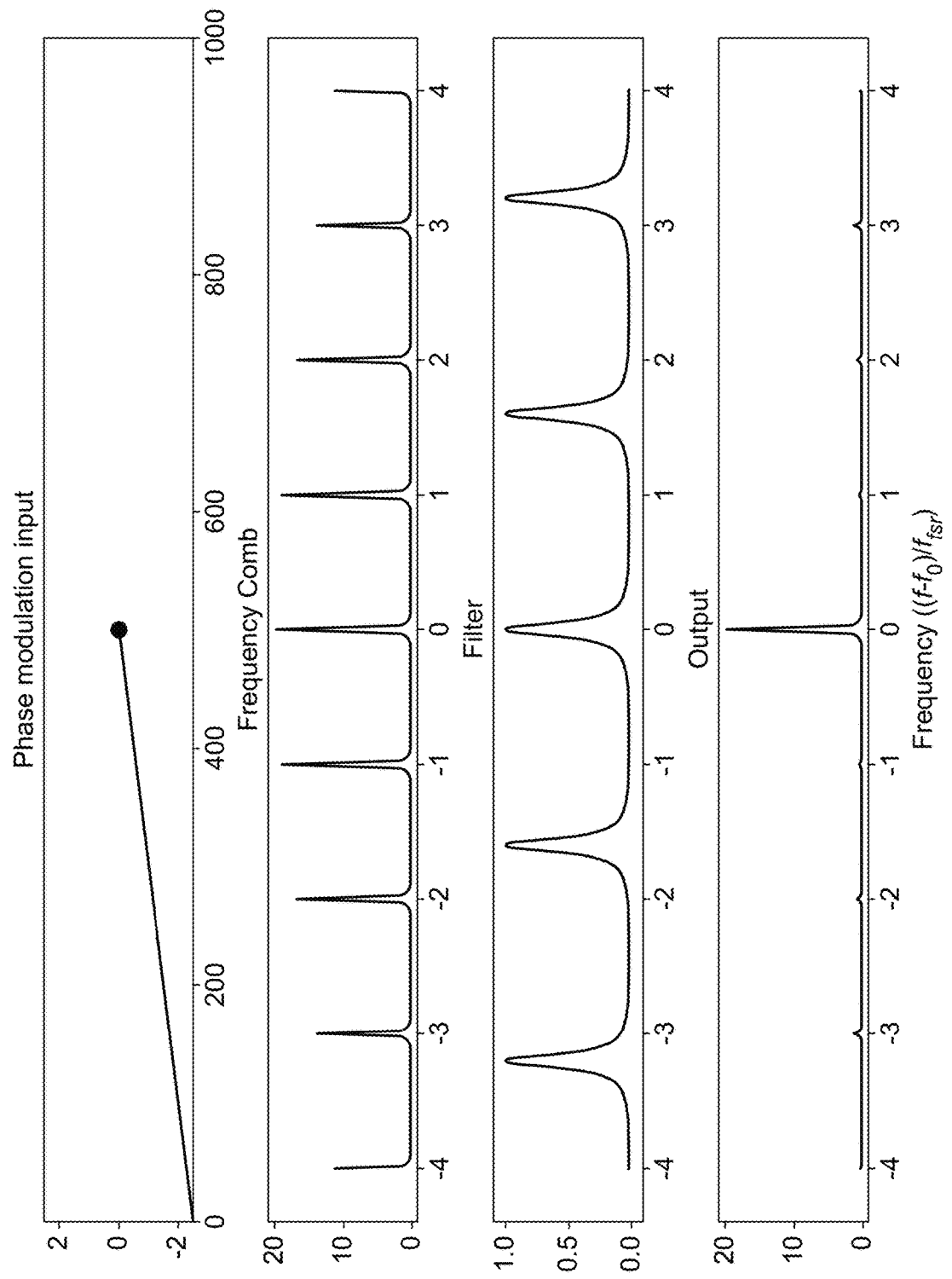
FIG. 11A shows a series of graphs showing how the mode selection module of FIG. 10 can be used to select a comb spectral mode according to an example.
Figure 11B:
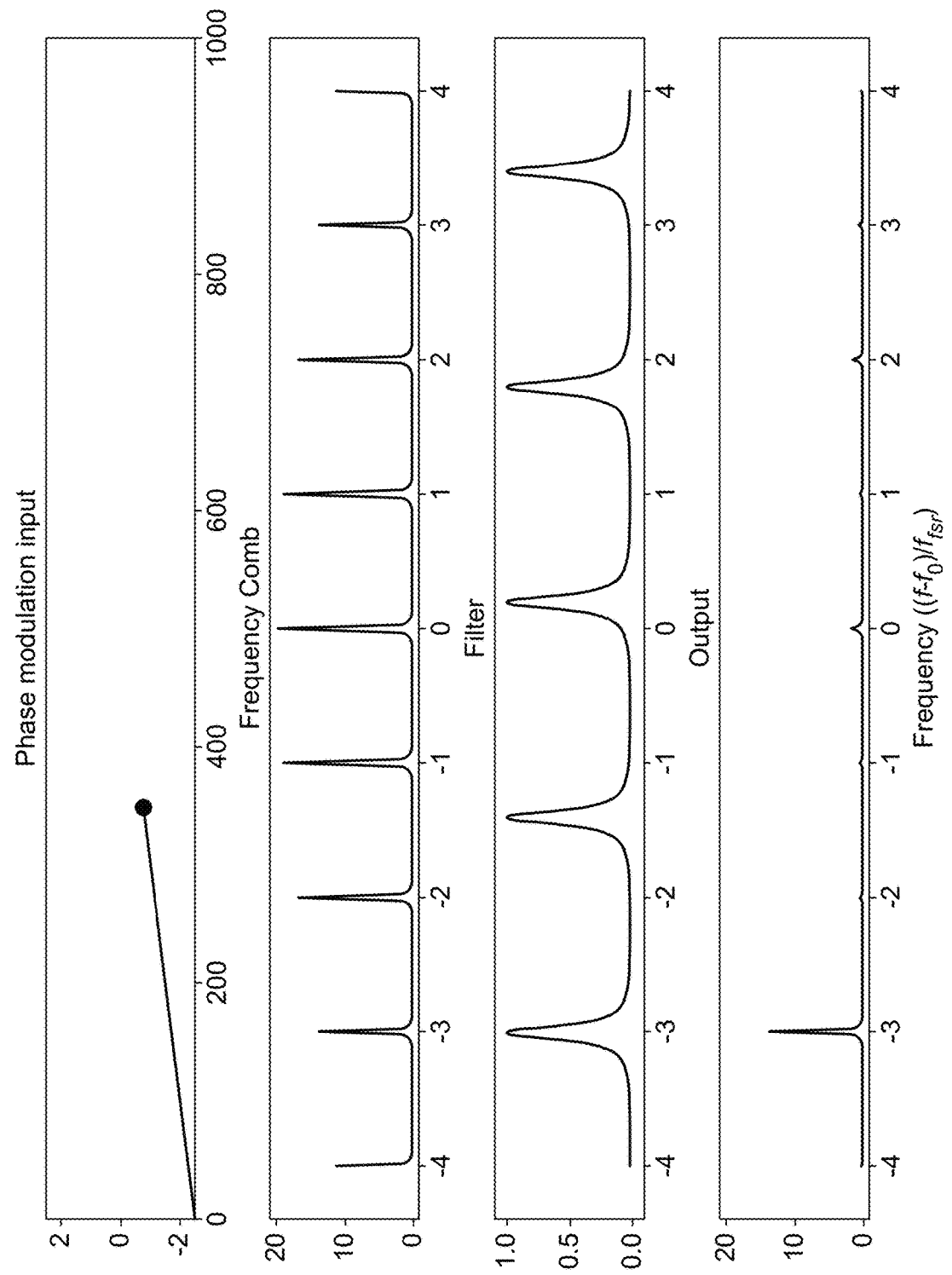
FIG. 11B shows a series of graphs showing how the mode selection module of FIG. 10 can be used to select a comb spectral mode according to an example.
Figure 11C:
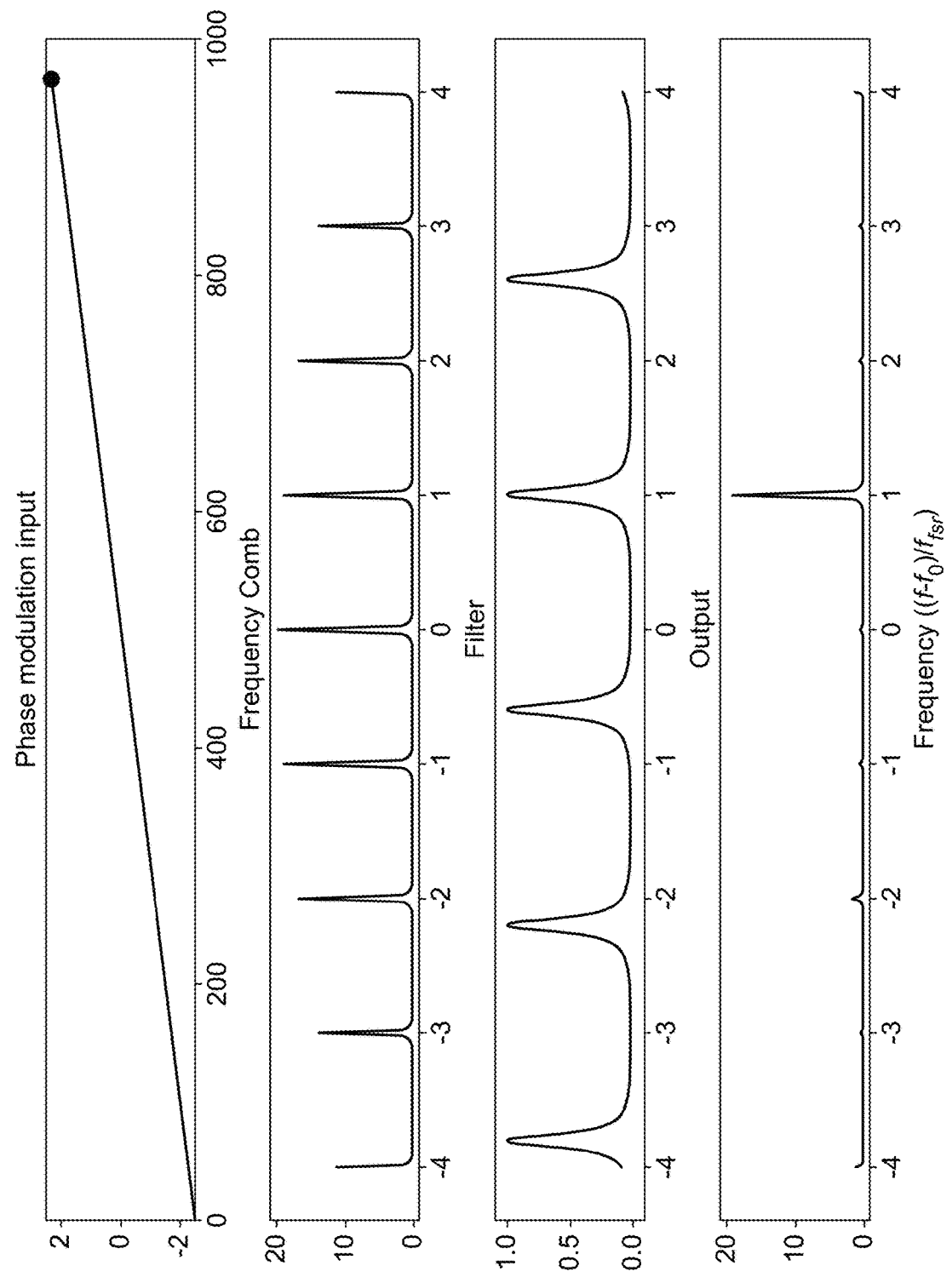
FIG. 11C shows a series of graphs showing how the mode selection module of FIG. 10 can be used to select a comb spectral mode according to an example.

FIGS. 11A-11C show a number of graphs indicating the way in which a change in the phase modulation as the EOM element 1006 can be used to select a specific comb spectral mode. Each figure shows four panels: the upper panel shows the control signal 830 (in these examples a phase modulator input), the second shows the spectral profile of the frequency comb 204, the third shows the spectral profile of the resonator 1004 and the fourth shows the spectral profile of the resonator output 210. This output spectrum only has peaks corresponding to frequency-comb modes which are resonant with the device (in other words, for frequencies where there is a peak in both panels two and three). In FIG. 11A, the phase modulation of the EOM 1006 is stabilised at a first value (top panel). Accordingly, when a frequency comb 204 (second panel from top, in which comb spectral modes are labelled with an integer from −4 to +4) is provided to the first optical coupler 1002, a selected mode 210 is coupled through the microresonator 1004 to the output of the second optical coupler 1008 (bottom panel). As shown by the bottom panel, only the zeroth mode is coupled through the microresonator to the output of the second optical coupler 1008. That is, by controlling the phase modulation, one is able to select the zeroth mode.

In FIG. 11B, the phase modulation of the EOM 1006 is stabilised at a second value (top panel). Accordingly, when a frequency comb 204 (second panel from top) is provided to the first optical coupler 1002, a selected mode 210 is coupled through the microresonator 1004 to the output of the second optical coupler 1008 (bottom panel). As shown by the bottom panel, the mode numbered minus three is coupled through the microresonator 1004 to the output of the second optical coupler 1008. The bottom graph illustrates also minor peaks for some other modes, notably the zeroth mode and the second mode, but these can be suppressed by a more suitable selection of the phase modulation or improved filter design.

In FIG. 11C, the phase modulation of the EOM 1006 is stabilised at a third value (top panel). Accordingly, when a frequency comb 204 (second panel from top) is provided to the first optical coupler 1002, a selected mode 210 is coupled through the microresonator 1004 to the output of the second optical coupler 1008 (bottom panel). As shown by the bottom panel, the first mode is strongly coupled through the microresonator to the output of the second optical coupler 1008.

The skilled person will appreciate that by selecting different values of the phase modulation, different comb spectral modes may be selected and thus output from the second output coupler.

Figure 12:
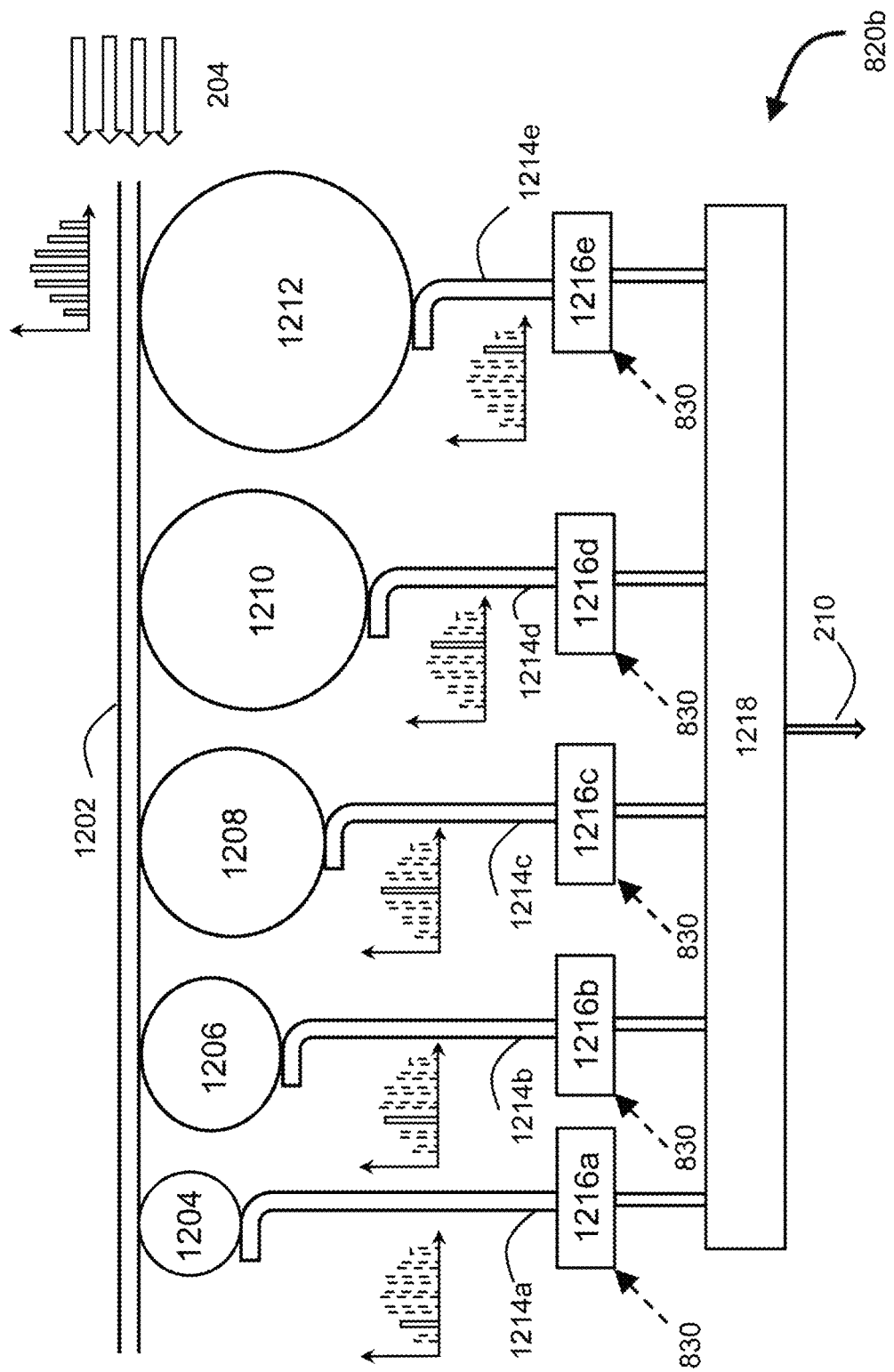
FIG. 12 shows an illustration of a mode selection module according to an example.

FIG. 12 shows an illustration of a comb spectral mode selection apparatus 820b according to an example. The comb spectral mode selection apparatus 820b comprises a first optical coupler 1202. The spectral mode selection apparatus 820b further comprises a plurality of microresonators 1204, 1206, 1208, 1210, 1212 and a corresponding plurality of second optical couplers 1214a-1214e. While five microresonators are shown in FIG. 12, the comb spectral mode selection apparatus 820b may comprise more or fewer microresonators. The plurality of WGM resonators comprise differently sized WGM resonators (e.g., the resonators have different diameters, and accordingly each resonator couples a different mode of the frequency comb 204 through the microresonator to the corresponding second optical coupler.

For each of the second optical couplers 1214a-1214e, the comb spectral mode selection apparatus comprises a corresponding controllable filtering element 1216a-1216e situated between the second optical coupler and an output port of the comb spectral mode selection apparatus 820b. Each filtering element 1216a-1216e is configured to controllably prevent an unwanted comb spectral modes from reaching the output port in response to a control signal 830 (or lack thereof). According to an example, each filtering element 1216a-1216e may comprise a semiconductor optical amplifier configured to controllably amplify or absorb the respective comb spectral mode of the amplifier's respective microresonator.

The unfiltered comb spectral mode (in other words, the selected comb spectral mode 210) is routed through a routing device 1218 to an output port for provision to the non-linear photonic element 212.

Figure 13A:
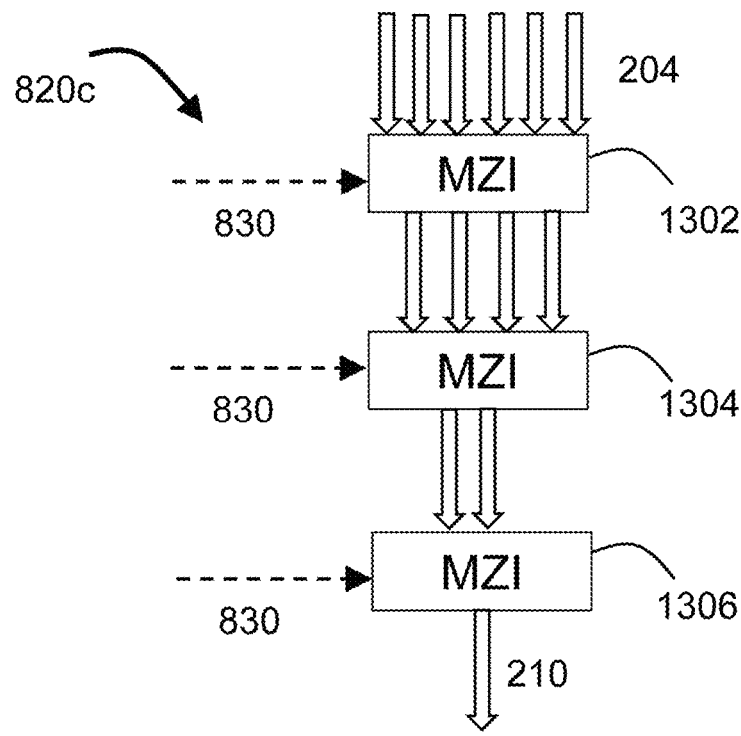
FIG. 13A shows an illustration of a mode selection module according to an example.

FIG. 13A shows an illustration of a comb spectral mode selection apparatus 820c according to an example. In this example, the comb spectral mode selection apparatus 820c comprises a plurality of cascaded Mach-Zehnder interferometer (MZI) based filters 1302, 1304, 1306. While three MZI filters are shown in FIG. 13A, the skilled person will appreciate that more or fewer filters may be used.

Figure 13B:
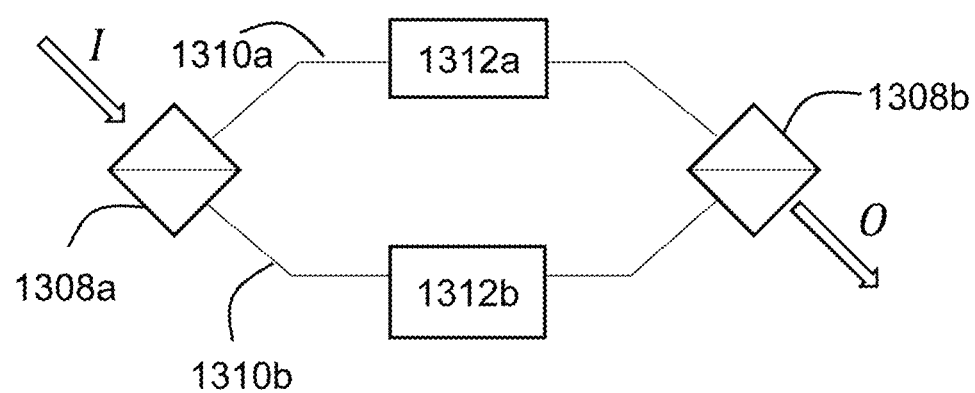
FIG. 13B shows an illustration of a Mach-Zehnder interferometer according to an example.

A Mach-Zehnder interferometer (FIG. 13B) comprises two 50:50 beamsplitters 1308a and 1308b with two optical paths 1310a and 1310b therebetween. These optical paths are hereafter referred to as the upper (1310a) and lower (1310b) optical paths respectively. The relative intensity at one of the output ports of the second beamsplitter 1308b can be modelled as:

$$\left|\frac{O}{I}\right|^2 = \frac{1}{2}(1 + \cos[\Phi_L - \Phi_U]) \quad \text{(Equation 4)}$$

where O is the output intensity, I is the input intensity, $\Phi_L$, is the phase accumulation of the field following the lower path 1310b of the MZI, and $\Phi_U$ is the phase accumulation of the field following the upper path 1310a of the MZI. The phase accumulation is a function of the length of the optical path taken, its refractive index, and the frequency of the field. Pockel cells 1312a, 1312b or other phase modulators are present to further control the phase accumulation of each arm. Accordingly, the phase accumulation of each path (J=U, L) can be described by:

$$\Phi_J = \frac{\omega}{c}(L_J n_m + l_{J,pockels} n_{J,pockels}) \quad \text{(Equation 5)}$$

where $n_m$ is the refractive index of the material, $n_{J,pockels}$ is the refractive index of the pockels cell in path J which has length $l_{J,pockels}$, $L_J$ is the remaining length of the optical arm J, ω is the frequency of light passing through, and c is the speed of light in a vacuum. Accordingly, there is a periodic frequency dependence in the output of the MZI, specifically when there is a length mismatch between both optical paths (for a given set of pockels cell parameters).

By controlling the various parameters specified in Equation 5, one may filter out light of a selected frequency. For example, the MZI can be manufactured such that the lengths of the pockel cells of both the upper arm 1310a and lower arm 1310b are the same, but the remaining lengths of the optical arms differ ($L_U \neq L_L$). The pockel cells 1312a, 1312b can be operated in a ground-signal-ground architecture such that $n_{U,pockels} = n_m + \delta n$ and $n_{L,pockels} = n_m - \delta n$, and the difference term δn is proportional to an input voltage (control signal 830).

The zeroth mode of frequency comb 204 can be selected by tuning the first MZI filter 1302 to have a period equal to twice the FSR of the frequency comb, tuning the second MZI filter 1304 to have a period equal to four times the FSR of the frequency comb, and tuning the third MZI filter 1306 to have a period of eight times the FSR of the frequency comb. The first MZI filter 1302 has the effect of suppressing comb spectral mode numbers ±1, ±3, ±5 and so on. The second MZI filter 1304 has the effect of suppressing mode numbers ±2, ±6 and so on. The third MZI filter 1306 has the effect of suppressing mode numbers ±8 and so on. Further MZI filters can be used to each suppress half of the remaining modes until no comb spectral mode remains that is suitable for interacting with a second photon 108 of a photon pair 110 at non-linear photonic element 212.

Of course, one may control the refractive indices of the pockel cells 1312a, 1312b in order to select a comb spectral mode other than the zeroth mode.

Figure 14:
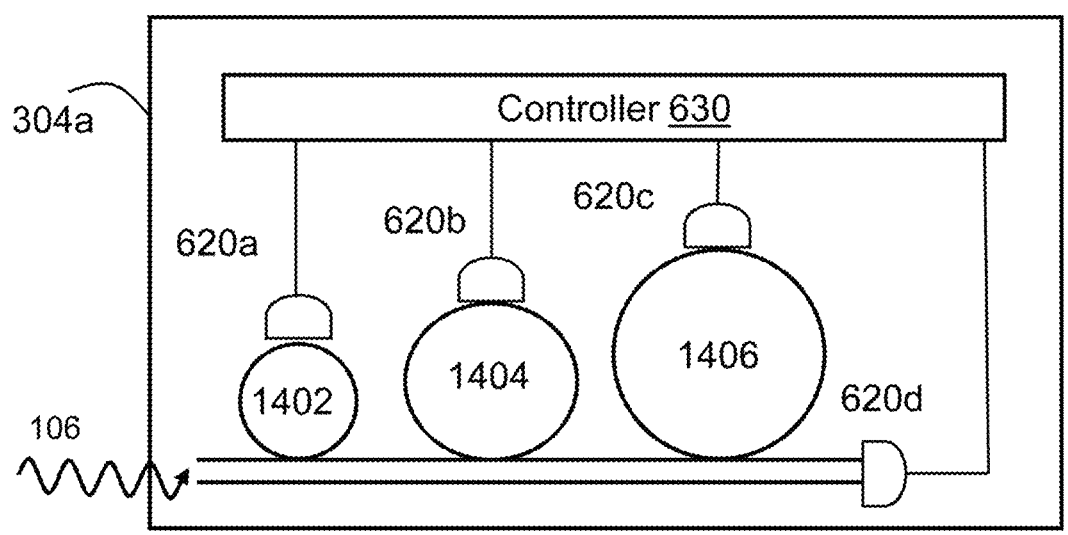
FIG. 14 shows an illustration of a detection module capable of generating a heralding signal based on a frequency of a photon according to an example.

FIG. 14 shows a detection module 304a according to an example. The detection module 304a utilises WGM resonators to spectrally demultiplex incident photons. In the detection module of FIG. 14, The detection module comprises a plurality of microresonators 1402, 1404, 1406, each having a unique diameter to cause the microresonator to be resonant with a corresponding frequency that a received photon 106 may possess from among a plurality of frequencies. While only three microresonators are illustrated in FIG. 14, the skilled person will appreciate that there may be a different number of microresonators. A photon 106 having a frequency resonant with one of the microresonators will be coupled via that microresonator to a corresponding photon detector 620, and accordingly, the controller 630 is able to determine a frequency of the detected photon 106. FIG. 14 further shows a detector 620d that is not aligned with a corresponding microresonator and instead is arranged to receive a single photon 106 that is not coupled into a microresonator. The skilled person will appreciate that such a detector 620d may be omitted.

Variations of the described embodiments are envisaged.

The controller(s) described herein (for example in relation to the detection module 304 and mode selector 206) may be embodied in hardware (e.g., on an integrated circuit), software, or a combination thereof. The controller(s) described herein may be configured to generate one or more signals to control hardware components to perform any of the methods described herein, such as those described in FIG. 4 or FIG. 9). A controller may be any kind of general or dedicated processor, such as a central processing unit (CPU), a graphics processing unit (GPU), or an integrated circuit.

Due to the speeds used to perform one or more of the methods described herein, it may be preferable to implement a controller for performing the method(s) in a dedicated, application-specific processing unit. For example, the controller may comprise an application-specific integrated circuit (ASIC) or an application-specific standard product (ASSP) or another domain-specific architecture (DSA). Alternatively, the controller may be implemented in adaptive computing hardware (that is, hardware comprising configurable hardware blocks or configurable logic blocks) that has been configured to perform the functions, for example in a configured field programmable gate array (FPGA).

Also described herein is a computer-readable storage medium having stored thereon a computer-readable circuit description of a controller. The circuit description, when processed by a controller generation system, causes the controller generation system to manufacture or otherwise generate an implementation of the controller.

The computer-readable circuit description may be in the form of computer code defining an implementation of the controller at any level. For example, the circuit description may comprise a hardware description language (HDL) description of the controller and/or a netlist. The circuit description may comprise (but is in no way limited to) one or more of (i) register transfer level (RTL) code, (ii) a high-level circuit representation such as Verilog or VHDL, and/or (iii) a low-level circuit representation such as OASIS®, GDSII, a bit file or other configuration file for configuring adaptive computing hardware to implement the controller. High-level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

The computer-readable circuit description may further include software which runs on the controller defined by the circuit description or in combination with the controller defined at the circuit description. For example, the circuit description, when processed by a controller generation system, may cause the controller generation system to, on manufacturing or otherwise generating the controller, load firmware onto that controller in accordance with program code defined at the circuit description or otherwise provide program code with the controller for use with the controller.

The controller generation system may be any system suitable for generating a controller (or at least an implementation thereof) by processing the computer-readable circuit description. As an example, if the controller is to be implemented in adaptive computing hardware, then the controller generation system may comprise a desktop or laptop computer or other computing hardware (having processing capability such that it can execute instructions), that is capable of configuring/loading a configuration file onto the adaptive computing hardware to thereby manufacture/generate an implementation of the controller. For example, manufacturing or otherwise generating an implementation of the controller may comprise configuring adaptive computing hardware by preparing and loading a configuration file provided as a part of or otherwise derived from the circuit description.

As another example, the controller generation system may comprise an integrated circuit manufacturing system (ICMS). The ICMS may comprise a layout processing subsystem configured to receive and process the computer-readable circuit description to determine a circuit layout. Methods of determining a circuit layout from a computer-readable circuit description are known in the art, and for example may involve synthesising RTL code to determine a gate level representation of a circuit to be generated, e.g. in terms of logical components. This may be done automatically or with user involvement in order to optimise the circuit layout. When the layout processing system has determined the circuit layout it may output a circuit layout definition to a manufacturing subsystem. The manufacturing subsystem may manufacture an integrated circuit embodying the controller by utilizing a semiconductor device fabrication process to generate the integrated circuit, which may involve a multi-step sequence of photo lithographic and chemical processing steps during which electronic circuits are gradually created on a wafer made of semiconducting material. For example, manufacturing or otherwise generating an implementation of the controller may comprise producing a circuit layout and utilizing a semiconductor device fabrication process to generate an integrated circuit based on that circuit layout.

A computer-readable storage medium may be, for example, but not limited to, an electronic, magnetic, optical, electromagnetic, infrared, or semiconductor system, apparatus, device, or any suitable combination thereof. More specific examples of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The word "module" has been used herein in relation to hardware functionality but is not intended to necessarily refer to distinct units: for example, the functionality of "two modules" may be combined into a single "module".

As used in this description and the claims, the singular forms "a", "an", and "the" include the plural forms unless the context clearly dictates otherwise.

All the features disclosed in this specification (including any accompanying claims, abstract and drawings), and/or all of the steps of any method or process so disclosed, may be combined in any combination, except combinations where at least some of the features and/or steps are mutually exclusive.

Each feature disclosed in this specification (including any accompanying claims, abstract or drawings), may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the spirit and scope of the claims.

What is claimed is:

1. A system for producing an output photon having a predefined frequency, the system comprising:
    a frequency comb generator configured to generate a Kerr frequency comb, the frequency comb generator comprising:
        one or more microresonators, each of the one or more microresonators supporting a corresponding optical resonance; and
        one or more optical couplers configured to couple light into and out of the one or more microresonators;
    a frequency comb mode selector configured to:
        receive a heralding signal representative of a detection of a first photon of a frequency-correlated photon pair, the heralding signal indicative of a frequency of a heralded second photon of the frequency-correlated photon pair; and
        select, based on the received heralding signal, a comb spectral mode of the Kerr frequency comb; and
    a non-linear photonic element comprising a beam combiner with non-linear material, the non-linear photonic element configured to receive the heralded second photon and the selected comb spectral mode and produce the output photon having the predefined frequency based on the frequency of the heralded second photon and a frequency of the selected comb spectral mode.

2. The system of claim 1, wherein the one or more microresonators comprise at least one of: a whispering gallery mode microresonator; or a ring microresonator.

3. The system of claim 1, wherein the frequency comb generator further comprises a pump laser.

4. The system of claim 1, wherein the frequency comb mode selector comprises:
    a microresonator; and
    an electro-optic modulator (EOM) configured to couple a selected comb spectral mode through the microresonator and towards the non-linear photonic element.

5. The system of claim 1, wherein the frequency comb mode selector comprises:
    a plurality of microresonators, each of the plurality of microresonators resonant with a respective comb spectral mode of the Kerr frequency comb and arranged to couple the respective comb spectral mode through the microresonator and towards the non-linear photonic element; and
    a plurality of controllable filtering elements, each filtering element situated between a respective microresonator and the non-linear photonic element and configured to controllably prevent unselected comb spectral modes from reaching the non-linear photonic element.

6. The system of claim 5, wherein at least one filtering element comprises a semiconductor optical amplifier configured to controllably amplify or absorb the respective comb spectral mode of the respective microresonator.

7. The system of claim 1, wherein the frequency comb mode selector comprises one or more Mach-Zehnder interferometers (MZIs).

8. The system of claim 1, further comprising a controller configured to control the frequency comb mode selector to select the comb spectral mode based on the heralding signal.

9. The system of claim 8, wherein the controller is implemented in an application specific integrated circuit (ASIC) or field programmable gate array (FPGA).

10. The system of claim 1, wherein at least a portion of the system is implemented on-chip.

11. The system of claim 1, wherein at least a portion of the system is implemented in bulk optics.

12. The system of claim 1, further comprising a photon pair source module configured to generate frequency-correlated photon pairs.

13. The system of claim 12, wherein the photon pair source module comprises a cavity parametric down conversion photon pair source.

14. The system of claim 1, further comprising a detection module comprising a detector arrangement comprising one or more photon detectors, the detector arrangement arranged to generate the heralding signal subsequent to a detecting the first photon of the frequency-correlated photon pair.

15. The system of claim 14, wherein the detection module further comprises:
    a spectral demultiplexer configured to guide photons along a plurality of frequency-dependent lightpaths;
    wherein each of the one or more photon detectors is coupled to a respective frequency-dependent lightpath of the spectral demultiplexer such that a detection event at a particular photon detector is associated with the detection of a photon having a frequency within a frequency range.

16. The system of claim 15, wherein the spectral demultiplexer comprises at least one microresonator that provides at least one of the plurality of frequency-dependent lightpaths.

17. A method comprising:
selecting, based on a received heralding signal, a comb spectral mode of a Kerr frequency comb; and
causing, based on the selected comb spectral mode, a reconfigurable mode selection apparatus to be reconfigured to permit the selected comb spectral mode to be incident on a non-linear photonic element,
wherein the received heralding signal is representative of a detection of a first photon of a frequency-correlated photon pair, the received heralding signal indicative of a frequency of a heralded second photon of the frequency-correlated photon pair, and
wherein the non-linear photonic element is configured to receive the heralded second photon and to produce an output photon having a frequency based on the frequency of the heralded second photon and a frequency of the selected comb spectral mode.

18. The method of claim 17, wherein the non-linear photonic element has different conversion efficiencies for different frequencies of heralded second photons.

19. The method of claim 18, wherein, in response to a contemporaneous detection of two first photons of two frequency-correlated photon pairs, the two first photons having different frequencies, selecting the comb spectral mode of the Kerr frequency comb comprises selecting a comb spectral mode that complements a heralded second photon of the two frequency-correlated photon pairs for which the non-linear photonic element has a greater conversion efficiency.

20. A controller configured to:
select, based on a received heralding signal, a comb spectral mode of a Kerr frequency comb; and
cause, based on the selected comb spectral mode, a reconfigurable mode selection apparatus to be reconfigured to permit the selected comb spectral mode to be incident on a non-linear photonic element,
wherein the received heralding signal is representative of a detection of a first photon of a frequency-correlated photon pair, the received heralding signal indicative of a frequency of a heralded second photon of the frequency-correlated photon pair, and
wherein the non-linear photonic element is configured to receive the heralded second photon and to produce an output photon having a frequency based on the frequency of the heralded second photon and a frequency of the selected comb spectral mode.

21. A non-transitory computer-readable storage medium having stored thereon a computer-readable circuit description of a controller configured to:
select, based on a received heralding signal, a comb spectral mode of a Kerr frequency comb; and
cause, based on the selected comb spectral mode, a reconfigurable mode selection apparatus to be reconfigured to permit the selected comb spectral mode to be incident on a non-linear photonic element,
wherein the received heralding signal is representative of a detection of a first photon of a frequency-correlated photon pair, the received heralding signal indicative of a frequency of a heralded second photon of the frequency-correlated photon pair,
wherein the non-linear photonic element is configured to receive the heralded second photon and to produce an output photon having a frequency based on the frequency of the heralded second photon and a frequency of the selected comb spectral mode, and
wherein the computer-readable circuit description, when processed in a controller generation system, causes the controller to manufacture or otherwise generate an implementation of the controller.

\* \* \* \* \*